(12) United States Patent
Catreux-Erceg et al.

(10) Patent No.: US 7,787,523 B2
(45) Date of Patent: *Aug. 31, 2010

(54) METHOD AND SYSTEM FOR DELAY MATCHING IN A RAKE RECEIVER FOR WCDMA CLOSED LOOP MODES

(75) Inventors: Severine Catreux-Erceg, Cardif, CA (US); Zoran Kostic, Holmdel, NJ (US); Joseph Boccuzzi, Manalapan, NJ (US)

(73) Assignee: Broadcom Corporation, Irvine, CA (US)

( * ) Notice: Subject to any disclaimer, the term of this patent is extended or adjusted under 35 U.S.C. 154(b) by 867 days.

This patent is subject to a terminal disclaimer.

(21) Appl. No.: 11/566,173

(22) Filed: Dec. 1, 2006

(65) Prior Publication Data

US 2008/0130718 A1 Jun. 5, 2008

(51) Int. Cl.
*H04B 1/00* (2006.01)
(52) U.S. Cl. ...................... 375/150; 375/152
(58) Field of Classification Search ......... 375/136–145, 375/147–152, 267, 349, 347
See application file for complete search history.

(56) References Cited

U.S. PATENT DOCUMENTS

| 7,460,583 | B2* | 12/2008 | Khayrallah et al. | 375/148 |
| 2004/0157567 | A1* | 8/2004 | Jootar et al. | 455/101 |
| 2005/0100082 | A1* | 5/2005 | Ma | 375/148 |
| 2007/0140320 | A1* | 6/2007 | Banna et al. | 375/148 |

* cited by examiner

*Primary Examiner*—Emmanuel Bayard
(74) *Attorney, Agent, or Firm*—McAndrews, Held & Malloy, Ltd.

(57) ABSTRACT

Certain aspects of a method and system for delay matching in a rake receiver for WCDMA closed loop modes are disclosed. Aspects of one method may include selecting a set of channel estimates from a plurality of channel estimates generated for a delay matched branch and/or a non-delay matched branch in a rake receiver. A plurality of weight factors may be generated based on the selected set of channel estimates. In the delay matched branch of the rake receiver, the application of the generated plurality of weight factors may be delayed by a particular time period. A delay associated with a control channel and/or a data channel may be compensated based on the delayed application of the generated plurality of weight factors.

30 Claims, 12 Drawing Sheets

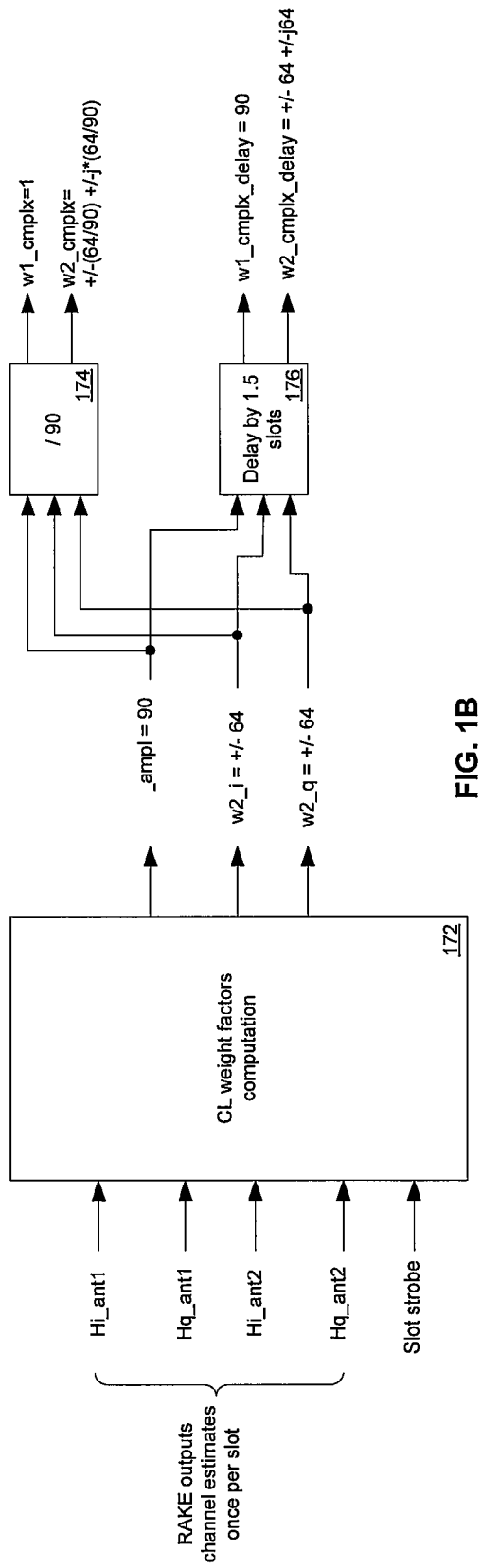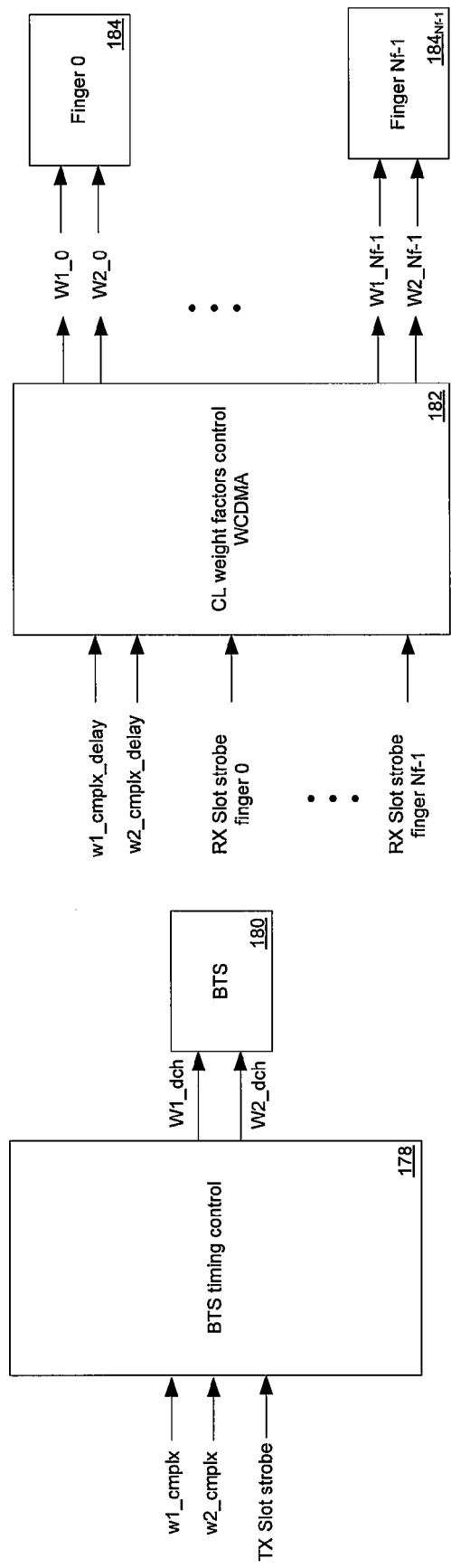
FIG. 1B
FIG. 1C
FIG. 1D

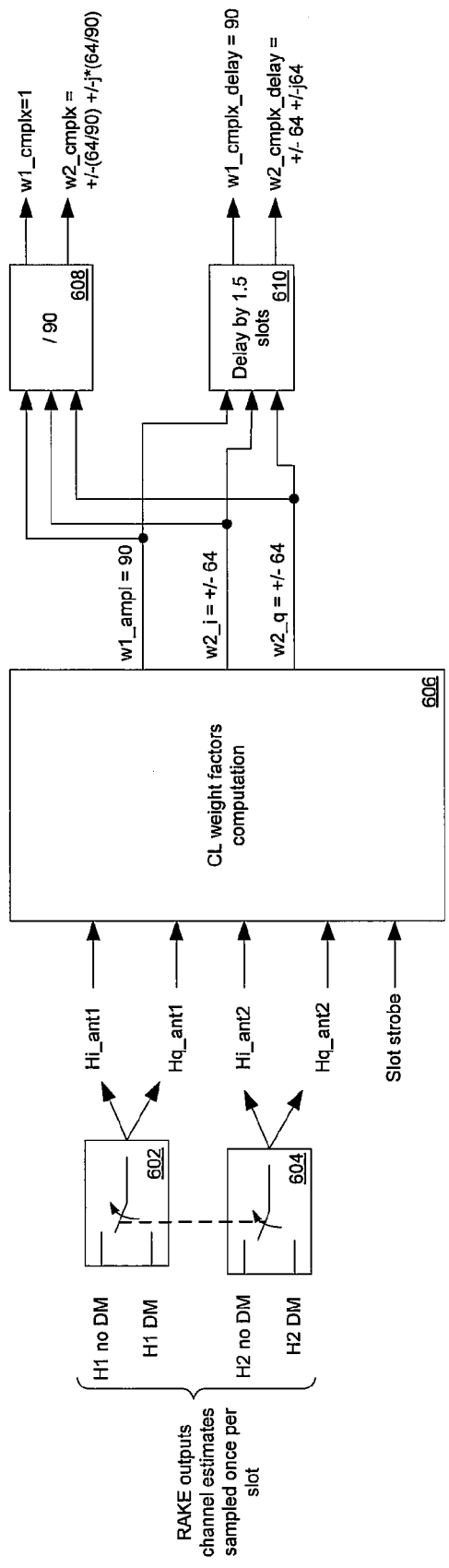
FIG. 6A
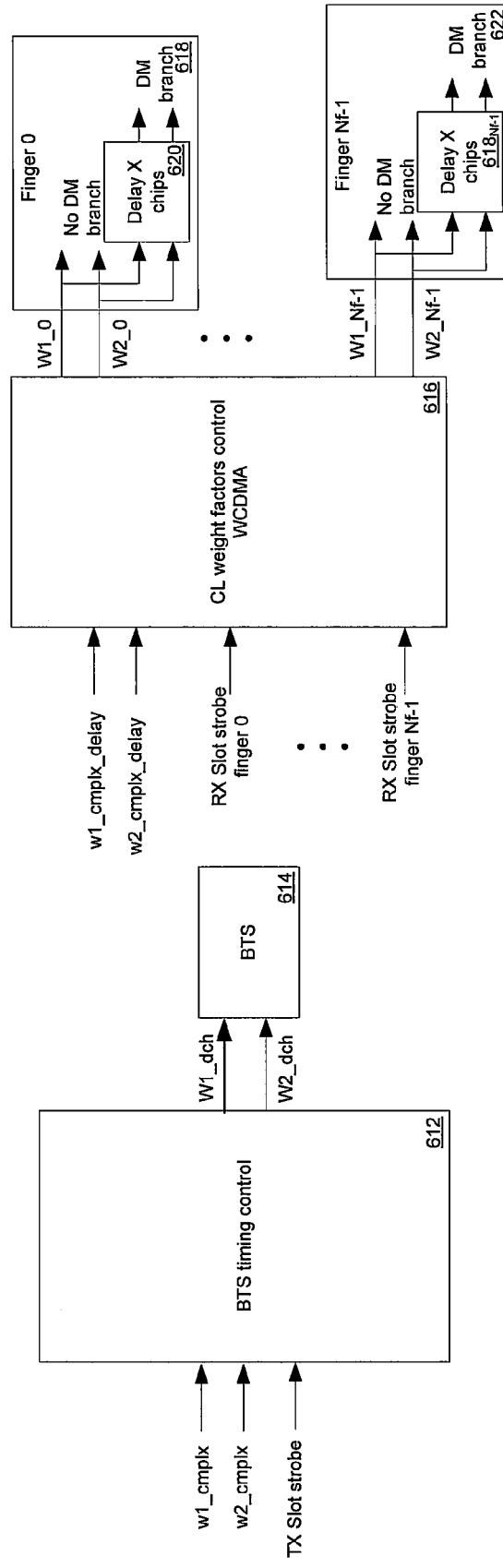
FIG. 6C
FIG. 6B

METHOD AND SYSTEM FOR DELAY MATCHING IN A RAKE RECEIVER FOR WCDMA CLOSED LOOP MODES

CROSS-REFERENCE TO RELATED APPLICATIONS/INCORPORATION BY REFERENCE

This application makes reference to:

U.S. patent application Ser. No. 11/607,438 filed Dec. 1, 2006; and

U.S. patent application Ser. No. 11/610,744 filed Dec. 1, 2006.

Each of the above referenced applications is hereby incorporated herein by reference in its entirety.

FIELD OF THE INVENTION

Certain embodiments of the invention relate to rake receivers. More specifically, certain embodiments of the invention relate to a method and system for delay matching in a rake receiver for wideband code division multiple access (WCDMA) closed loop modes.

BACKGROUND OF THE INVENTION

Mobile communications has changed the way people communicate and mobile phones have been transformed from a luxury item to an essential part of every day life. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

However, implementing advanced wireless technologies such as WCDMA and/or HSDPA may still require overcoming some architectural hurdles. For example, the RAKE receiver is the most commonly used receiver in CDMA systems, mainly due to its simplicity and reasonable performance. A RAKE receiver contains a bank of spreading sequence correlators, each receiving an individual multipath. A RAKE receiver operates on multiple discrete paths. The received multipath signals may be combined in several ways, from which maximum ratio combining (MRC) is preferred in a coherent receiver. However, a RAKE receiver may be sub-optimal in many practical systems. For example, its performance may degrade from multiple access interference (MAI), that is, interference induced by other users in the network.

In the case of a WCDMA downlink, MAI may result from intercell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intracell interference may be caused by multipath propagation. In some instances, intracell interference may comprise inter-path interference (IPI). IPI may occur when one or more paths, or RAKE "fingers," interfere with other paths within the RAKE receiver. Due to the non-zero cross-correlation between spreading sequences with arbitrary time shifts, interference occurs between propagation paths (or RAKE fingers) after despreading, causing MAI. The level of intracell interference depends strongly on the channel response. In nearly flat fading channels, the physical channels remain almost completely orthogonal and intra-cell interference does not have any significant impact on the receiver performance. On the other hand, the performance of the RAKE receiver may be severely deteriorated by intra-cell interference in frequency selective channels. Frequency selectivity is common for the channels in WCDMA networks.

Due to the difficulties faced when non-linear channel equalizers are applied to a WCDMA downlink, detection of the desired physical channels with a non-linear equalizer may result in implementing an interference canceller or optimal multi-user receiver. Both types of receivers may be prohibitively complex for mobile terminals and may require information not readily available at the mobile terminal. Alternatively, the total base station signal may be considered as the desired signal. However, non-linear equalizers rely on prior knowledge of the constellation of the desired signal, and this information is not readily available at the WCDMA terminal. The constellation of the total base station signal, that is, sum of all physical channels, may be a high order quadrature amplitude modulation (QAM) constellation with uneven spacing. The spacing of the constellation changes constantly due to transmission power control (TPC) and possible power offsets between the control data fields, time-multiplexed to the dedicated physical channels. The constellation order may also frequently change due to discontinuous transmission. This makes an accurate estimation of the constellation very difficult.

In this regard, the use of multiple transmit and/or receive antennas may result in an improved overall system performance. These multi-antenna configurations, also known as smart antenna techniques, may be utilized to mitigate the negative effects of multipath and/or signal interference on signal reception. It is anticipated that smart antenna techniques may be increasingly utilized both in connection with the deployment of base station infrastructure and mobile subscriber units in cellular systems to address the increasing capacity demands being placed on those systems. These demands arise, in part, from a shift underway from current voice-based services to next-generation wireless multimedia services that provide voice, video, and data communication.

The utilization of multiple transmit and/or receive antennas is designed to introduce a diversity gain and to suppress interference generated within the signal reception process. Such diversity gains may improve system performance by increasing received signal-to-noise ratio, by providing more robustness against signal interference, and/or by permitting greater frequency reuse for higher capacity. In communication systems that incorporate multi-antenna receivers, a set of M receive antennas may be utilized to null the effect of (M−1) interferers, for example. Accordingly, N signals may be simultaneously transmitted in the same bandwidth using N transmit antennas, with the transmitted signal then being separated into N respective signals by way of a set of N antennas deployed at the receiver. Systems that utilize multiple transmit and receive antennas may be referred to as multiple-input multiple-output (MIMO) systems. One attractive aspect of multi-antenna systems, in particular MIMO systems, is the significant increase in system capacity that may be achieved by utilizing these transmission configurations. For a fixed overall transmitted power, the capacity offered by a MIMO configuration may scale with the increased signal-to-noise ratio (SNR). For example, in the case of fading multipath channels, a MIMO configuration may increase system capacity by nearly M additional bits/cycle for each 3-dB increase in SNR.

However, the widespread deployment of multi-antenna systems in wireless communications, particularly in wireless handset devices, has been limited by the increased cost that results from increased size, complexity, and power consumption. Providing a separate RF chain for each transmit and receive antenna is a direct factor that increases the cost of multi-antenna systems. As the number of transmit and receive antennas increases, the system complexity, power consumption, and overall cost may increase. In addition, conventional methods of signal processing at the receiver side of a wireless communication system do not take into account outside interference as well as IPI resulting within a multipath fading environment. This poses problems for mobile system designs and applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for delay matching in a rake receiver for wideband code division multiple access (WCDMA) closed loop modes, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1B is an exemplary block diagram for calculating closed loop weight factors in a rake receiver without delay matching, in accordance with an embodiment of the invention.

FIG. 1C is an exemplary block diagram utilizing closed loop weight factors in a base station transmitter, in accordance with an embodiment of the invention.

FIG. 1D is an exemplary block diagram utilizing closed loop weight factors in a rake receiver without delay matching, in accordance with an embodiment of the invention.

FIG. 6A is an exemplary block diagram for calculating closed loop weight factors in a rake receiver with delay matching, in accordance with an embodiment of the invention.

FIG. 6B is an exemplary block diagram utilizing closed loop weight factors in a base station transmitter, in accordance with an embodiment of the invention.

FIG. 6C is an exemplary block diagram utilizing closed loop weight factors in a rake receiver with delay matching, in accordance with an embodiment of the invention.

DETAILED DESCRIPTION OF THE INVENTION

Certain embodiments of the invention may be found in a method and system for delay matching in a rake receiver for wideband code division multiple access (WCDMA) closed loop modes. Certain aspects of the invention may comprise selecting a set of channel estimates from a plurality of channel estimates generated for a delay matched branch and/or a non-delay matched branch in a rake receiver. A plurality of weight factors may be generated based on the selected set of channel estimates. In the delay matched branch of the rake receiver, the application of the generated plurality of weight factors may be delayed by a particular time period. A delay associated with a control channel and/or a data channel may be compensated based on the delayed application of the generated plurality of weight factors.

Figure 1A:
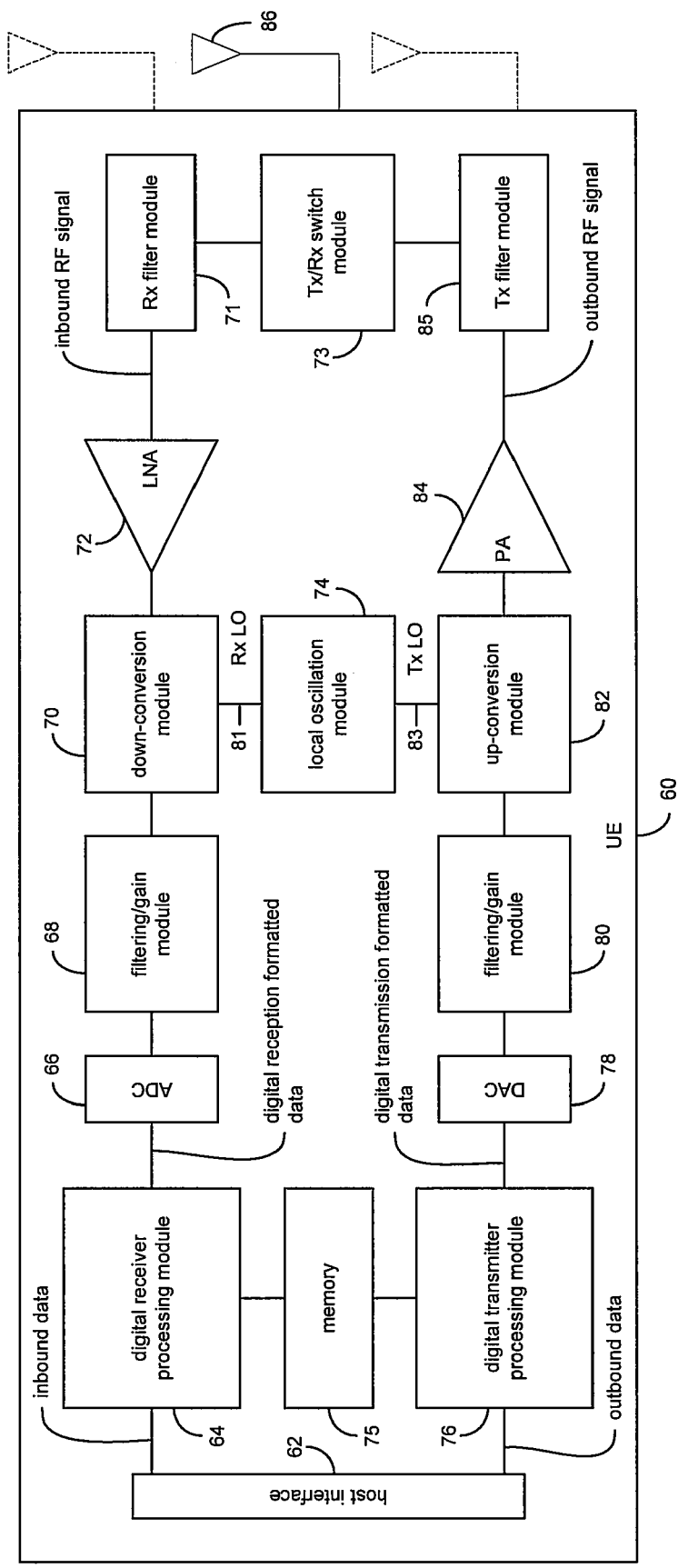
FIG. 1A is a block diagram illustrating a wireless communication user equipment, in accordance with an embodiment of the invention.

FIG. 1A is a block diagram illustrating a wireless communication user equipment, in accordance with an embodiment of the invention. Referring to FIG. 1A, there is shown a user equipment (UE) 60.

The UE 60 may comprise a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 may be shared by the transmit and receive paths as regulated by the Tx/Rx switch module 73.

The digital receiver processing module 64 and the digital transmitter processing module 76, in combination with operational instructions stored in the memory 75, may be enabled to execute digital receiver functions and digital transmitter functions, respectively. The digital receiver functions may comprise, but are not limited to, demodulation, constellation demapping, decoding, and/or descrambling. The digital transmitter functions may comprise, but are not limited to, scrambling, encoding, constellation mapping, and modulation. The digital receiver and the transmitter processing modules 64 and 76, respectively, may be implemented using a shared processing device, individual processing devices, or a plurality of processing devices, for example, a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

The memory 75 may be a single memory device or a plurality of memory devices. For example, the memory 75 may be a read-only memory, random access memory, volatile memory, non-volatile memory, static memory, dynamic memory, flash memory, and/or any device that stores digital information. When the digital receiver processing module 64 and/or the digital transmitter processing module 76 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. The memory 75 may be enabled to store, and digital receiver processing module 64 and/or digital transmitter processing module 76 may be enabled to execute, operational instructions corresponding to at least some of the functions illustrated herein.

In operation, the UE 60 may be enabled to receive outbound data via host interface 62. The host interface 62 may be enabled to route outbound data to the digital transmitter processing module 76. The digital transmitter processing module 76 may be enabled to process the outbound data in accordance with a particular wireless communication standard or protocol, for example, WCDMA to produce digital transmission formatted data. The digital transmission formatted data may be a digital baseband signal or a digital low IF signal, where the low IF may be in the frequency range of one hundred kilohertz to a few megahertz, for example.

The digital-to-analog converter 78 may be enabled to convert the digital transmission formatted data from the digital domain to the analog domain. The filtering/gain module 80 may be enabled to filter and/or adjusts the gain of the analog baseband signal prior to providing it to the up-conversion module 82. The up-conversion module 82 may be enabled to directly convert the analog baseband signal, or low IF signal, into an RF signal based on a transmitter local oscillation 83 provided by the local oscillation module 74. The power amplifier 84 may enable amplification of the RF signal to produce an outbound RF signal, which may be filtered by the transmitter filter module 85. The antenna 86 may be enabled to transmit the outbound RF signal to a targeted device such as a base station, an access point and/or another wireless communication device.

The UE 60 may be enabled to receive an inbound RF signal via antenna 86, which was transmitted by a base station, an access point, or another wireless communication device. The antenna 86 may be enabled to communicate the inbound RF signal to the receiver filter module 71 via Tx/Rx switch module 73, where Rx filter module 71 bandpass filters inbound RF signal. The Rx filter module 71 may be enabled to communicate the filtered RF signal to the low noise amplifier 72, which may amplify the inbound RF signal to generate an amplified inbound RF signal. The low noise amplifier 72 may be enabled to communicate the amplified inbound RF signal to the down-conversion module 70, which may directly convert the amplified inbound RF signal into an inbound low IF signal or baseband signal based on a receiver local oscillation 81 provided by local oscillation module 74. The down-conversion module 70 may be enabled to communicate the inbound low IF signal or baseband signal to the filtering/gain module 68. The filtering/gain module 68 may be enabled to filter and/or attenuate the inbound low IF signal or the inbound baseband signal to produce a filtered inbound signal.

The analog-to-digital converter 66 may be enabled to convert the filtered inbound signal from the analog domain to the digital domain to generate digital reception formatted data. The digital receiver processing module 64 may be enabled to decode, descramble, demap, and/or demodulate digital reception formatted data to recapture inbound data. The host interface 62 may be enabled to communicate the recaptured inbound data to a wireless communication host device.

The local oscillation module 74 may be enabled to adjust an output frequency of a received local oscillation signal. The local oscillation module 74 may be enabled to receive a frequency correction input to adjust an output local oscillation signal to generate a frequency corrected local oscillation signal output.

FIG. 1B is an exemplary block diagram for calculating closed loop weight factors in a rake receiver without delay matching, in accordance with an embodiment of the invention. Referring to FIG. 1B, there is shown a closed loop (CL) weight factors computation block 172, a divider block 174 and a delay block 176.

The CL weight factors computation block 172 may comprise suitable logic, circuitry and/or code that may be enabled to receive the rake receiver output channel estimates, for example, Hi_ant1, Hq_ant1, Hi_ant2, Hq_ant2, and a slot strobe that may indicate the slot end boundary at the rake receiver. The received channel estimates, for example, Hi_ant1, Hq_ant1, Hi_ant2, Hq_ant2 may each be a 1×Nf vector, for example, if the rake receiver has Nf fingers.

The channel estimates may be sampled once per slot, and may be passed to the CL weight factors computation block 172. The CL weight factors computation block 172 may be enabled to compute the weight factors, for example, by solving for weight vector, w, that maximizes:

$$P = w^H H^H H w \qquad (1)$$

where $H=[h_1 \ h_2]$ and $w=[w_1, w_2]^T$ and where the column vectors $h_1$ and $h_2$ represent the estimated channel impulse responses for the transmission antennas 1 and 2, of length equal to the length of the channel impulse response, for example. The elements of w may correspond to the adjustments computed by the UE 190 of FIG. 1F. In accordance with an embodiment of the invention, the CL mode weight factors may also, for example, be updated once per slot. The weight factor $W_1$ may be a constant scalar, for example, the amplitude of $W_1$, w1_ampl may be equal to 90, for example. The weight factor $W_2$ may be a complex valued signal, for example, the in-phase component of $W_2$, w2_i may be equal to +/−64, and the quadrature (Q) component of $W_2$, w2_q may be equal to +/−64.

The divider block 174 may be enabled to receive the weight factors, $W_1$ and $W_2$ from the CL weight factors computation block 172, and divide the received weight factors by 90. The divider block 174 may be enabled to generate a plurality of complex valued weight factors, w1_cmplx and w2_cmplx, where w1_cmplx may be equal to 1, for example, and w2_cmplx may be equal to +/−(64/90)+/−j*(64/90). The complex valued weight factors may be communicated to the transmitter.

The delay block 176 may be enabled to receive the weight factors, $W_1$ and $W_2$ from the CL weight factors computation block 172, and delay the received weight factors by 1.5 slots, for example. Notwithstanding, the received weight factors may be delayed by any other suitable number of slots. The delay block 176 may be enabled to generate a plurality of complex valued delayed weight factors, w1_cmplx_delay and w2_cmplx_delay, where w1_cmplx_delay may be equal to 90, for example, and w2_cmplx_delay may be equal to +/−64+/−j64. The complex valued delayed weight factors may be communicated to the rake receiver.

FIG. 1C is an exemplary block diagram utilizing closed loop weight factors in a base station transmitter, in accordance with an embodiment of the invention. Referring to FIG. 1C, there is shown a base station (BTS) timing control block 178, and a base station (BTS) 180.

The BTS timing control block 178 may comprise suitable logic, circuitry, and/or code that may be enabled to receive the complex valued weight factors, w1_cmplx and w2_cmplx, from the divider block 174, and a transmitter slot strobe that indicates the slot end boundary. The BTS timing control block 178 may be enabled to delay the received complex valued weight factors, w1_cmplx and w2_cmplx, until they are aligned with the next occurrence of the transmitter slot end boundary plus one full slot delay, for example. The BTS timing control block 178 may be enabled to generate a plurality of dedicated physical channel (DCH) weight factors, W1_dch and W2_dch, which correspond to delayed values of w1_cmplx and w2_cmplx. The BTS 180 may be enabled to receive the plurality of DCH weight factors, W1_dch and W2_dch from the BTS timing control block 178 to optimize the system performance at the output of the rake receiver.

FIG. 1D is an exemplary block diagram utilizing closed loop weight factors in a rake receiver without delay matching, in accordance with an embodiment of the invention. Referring to FIG. 1D, there is shown a CL weight factors control WCDMA block 182, and a plurality of rake receiver fingers, for example, finger 0 184 to finger Nf−1 $184_{Nf-1}$.

The CL weight factors control WCDMA block 182 may comprise suitable logic, circuitry, and/or code that may be enabled to receive the complex valued delayed weight factors, w1_cmplx_delay and w2_cmplx_delay, from the delay block 176, and a plurality of receiver slot strobes that indicate the slot end boundary, for example, receiver slot strobe each for finger 0 to finger Nf−1. The CL weight factors control WCDMA block 182 may be enabled to delay the received complex valued delayed weight factors, w1_cmplx_delay and w2_cmplx_delay, until they are aligned with the next occurrence of the slot end boundary, for example, for 2 slots. The CL weight factors control WCDMA block 182 may be enabled to generate a plurality of weight factors, for example, W1_0 and W2_0 for finger 0 184, W1_Nf−1 and W2_Nf−1 for finger Nf−1 $184_{Nf-1}$ to optimize the system performance at the output of the rake receiver.

Figure 1E:
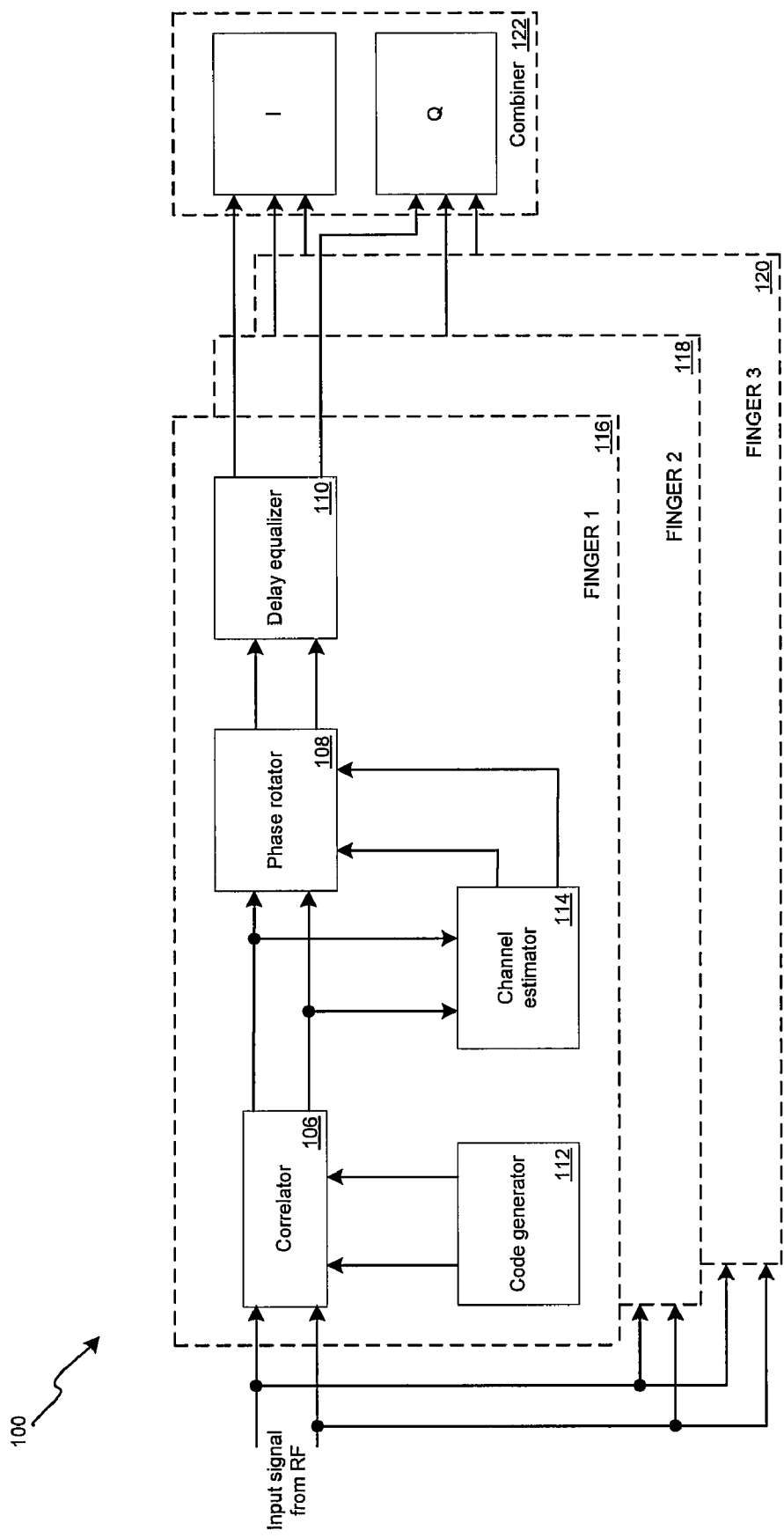
FIG. 1E is a block diagram of an exemplary rake receiver, in accordance with an embodiment of the invention.

FIG. 1E is a block diagram of an exemplary rake receiver, in accordance with an embodiment of the invention. Referring to FIG. 1E, there is shown a rake receiver 100. The rake receiver 100 may comprise a plurality of rake fingers, finger 1 116, finger 2 118, finger 3 120, and a combiner 122. Each rake finger, for example, finger 1 116 may comprise a correlator 106, a phase rotator 108, a delay equalizer 110, a code generator 112, and a channel estimator 114.

Each of the rake fingers, for example, finger 0 116, finger 1 118, and finger 3 120 may be enabled to receive an input RF signal from the receiver frontend. The correlator 106 may comprise suitable logic, circuitry and/or code that may be enabled to receive the input RF signal from the receiver frontend. The correlator 106 may enable despreading and integration of user data symbols. The correlator 106 may be enabled to multiply the received signals with a time-shifted version of a code-generated sequence generated by the code generator 112. The correlator 106 may be enabled to integrate the despread data over one symbol period, for example, and generate a complex sample output per quadrature phase-shift keying (QPSK) symbol. The spreading factor may be selected to have a particular autocorrelation value for a nonzero time offset.

The channel estimator 114 may comprise suitable logic, circuitry, and/or code that may be enabled to generate a plurality of channel estimates for each channel based on the correlated signals and generate an output to the phase rotator 108. The channel estimator 114 may be enabled to estimate the state of the channel from pilot symbols, for example. The phase rotator 108 may comprise suitable logic, circuitry, and/or code that may be enabled to receive the plurality of channel estimates from the channel estimator 114 and generate an output to the delay equalizer 110. The delay equalizer 110 may comprise suitable logic, circuitry, and/or code that may be enabled to receive an input signal from the phase rotator 108 and generate a delayed output signal to the combiner 122 to compensate for the delay in the difference of arrival times of symbols at each finger.

The combiner 122 may comprise suitable logic, circuitry, and/or code that may be enabled to receive the I and Q signals from each finger, for example, finger 1 116, finger 2 118, and finger 3 120, and combine the received signals based on a particular combining algorithm, for example, maximum ratio combining.

The rake receiver 100 may be a radio receiver that may be designed to counter the effects of multipath fading by using a plurality of sub-receivers. Each sub-receiver may be delayed in order to tune to an individual multipath component. Each component may be decoded independently, and combined, which may result in a higher signal-to-noise ratio (SNR) (or Eb/No) in a multipath environment.

In the rake receiver 100, one rake finger may be assigned to each multipath, which may result in maximizing the amount of received signal energy. Each of these different multipath signals may be combined to form a composite signal that may have substantially better characteristics than a single path. The received signal may be split into a plurality of independent paths, which may be combined with their corresponding channel estimates.

Figure 1F:
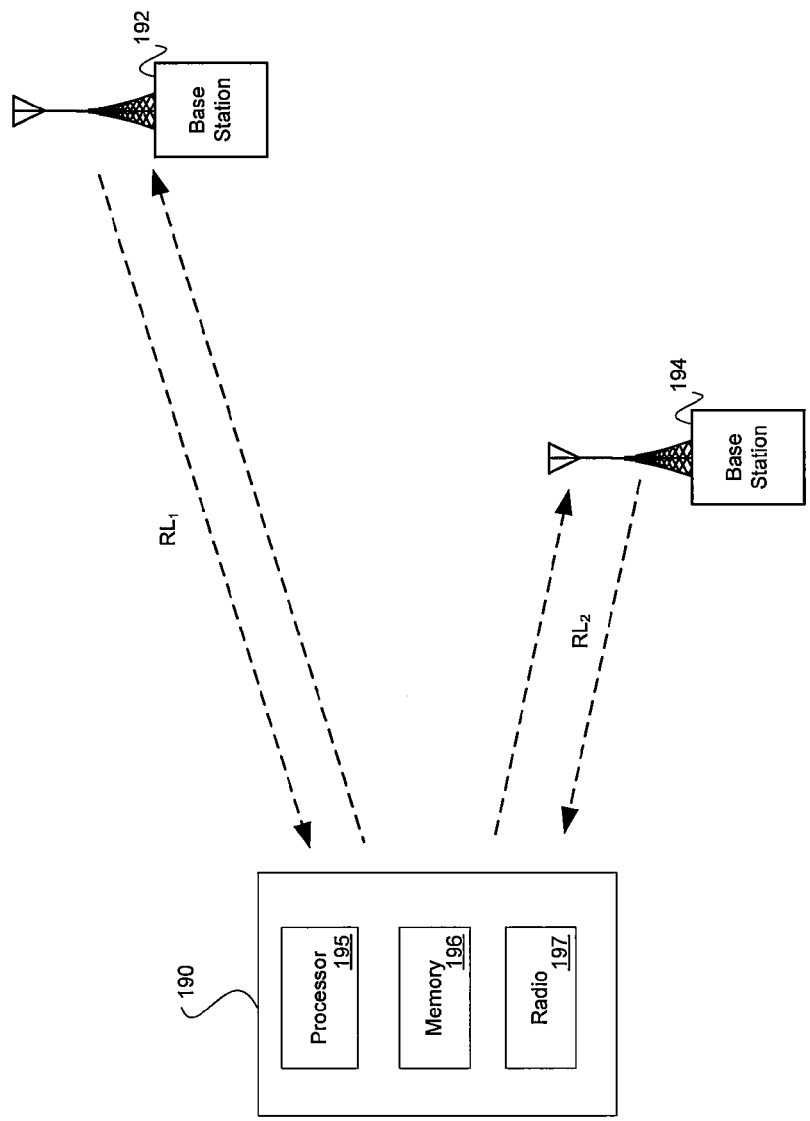
FIG. 1F is an exemplary diagram illustrating a user equipment communicating with two WCDMA base stations, in accordance with an embodiment of the invention.

FIG. 1F is an exemplary diagram illustrating a user equipment communicating with two WCDMA base stations, in accordance with an embodiment of the invention. Referring to FIG. 1F, there is shown a mobile handset or user equipment (UE) 190, a plurality of base stations BS 192 and BS 194 and a plurality of radio links (RL), $RL_1$ and $RL_2$ coupling the user equipment 190 with the base stations BS 192 and BS 194 respectively. The user equipment 190 may comprise a processor 195, a memory 196, and a radio 197.

The processor 195 may communicate and/or control a plurality of bits to/from the base stations BS 192 and BS 194. The memory 196 may comprise suitable logic, circuitry, and/or code that may store data and/or control information. The radio 197 may comprise transmit circuitry and/or receive circuitry that may be enabled to calculate a signal to noise ratio (SNR) of a downlink dedicated physical channel (DPCH) based on a plurality of transmit power control (TPC) bits received via the downlink dedicated physical channel (DPCH), wherein the plurality of TPC bits are not known when they are received. The radio links that belong to the same radio link set broadcast the same values of transmit power control (TPC) bits. The radio links that belong to different radio link sets may broadcast different TPC bits. The user equipment 190 may receive TPC bits via multiple radio links, for example, $RL_1$ and $RL_2$ simultaneously. In a handover situation, the user equipment 190 may receive signals from multiple radio link sets simultaneously.

The WCDMA specification defines the physical random access channel (PRACH) for mobile phone uplinks and the acquisition indicator channel (AICH) for BTS downlinks. Communication is established when the user equipment 190 completes its search for a base station, for example, BS 192 and synchronizes its PRACH uplink signal with the BTS AICH downlink signal. When operating properly, the base station recognizes a PRACH preamble from the user equipment 190 and responds with an AICH to establish a communication link. The user equipment 190 may use the PRACH to transmit its setting of its open loop power control to the base station 192. Incorrect data in the PRACH preamble or problems with the signal quality may cause missed connections, disrupt the capacity of the cell or prevent response from the base station 192.

Figure 2A:
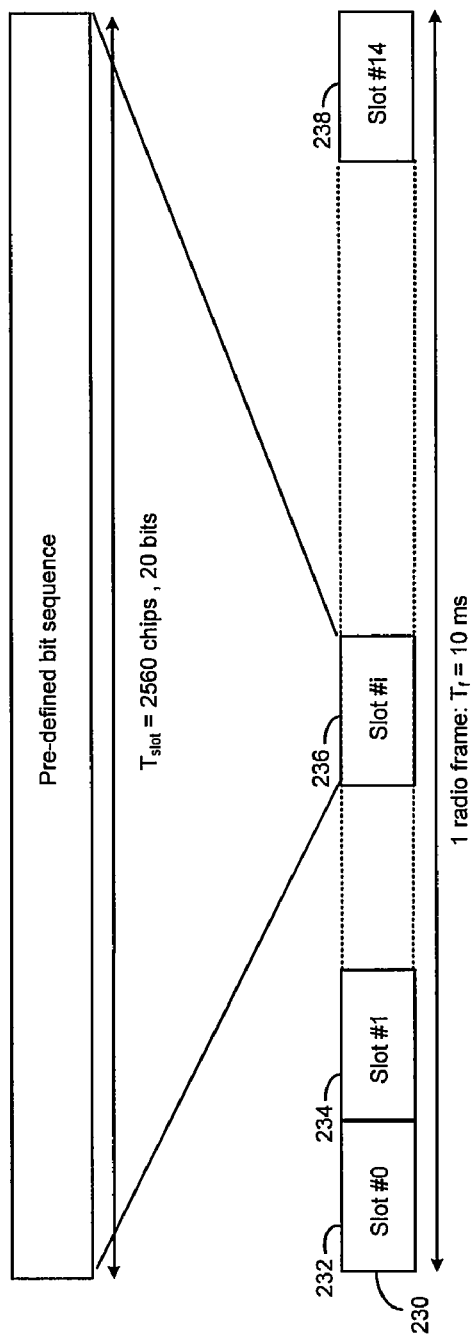
FIG. 2A is a diagram of an exemplary frame structure for a common pilot channel, in accordance with an embodiment of the invention.

FIG. 2A is a diagram of an exemplary frame structure for a common pilot channel, in accordance with an embodiment of the invention. Referring to FIG. 2A, there is shown a common pilot channel (CPICH) 230. The CPICH 230 may comprise a plurality of slots, for example, 15 slots, slot 0 232, slot 1 234, slot i 236, and slot 14 238.

The CPICH 230 may be a fixed rate downlink physical channel, for example, with a 30 kbps rate and a spreading factor of 256. The CPICH 230 may be enabled to carry a pre-defined bit sequence. For example, if the CPICH 230 has a time period, $T_f$ equal to 10 ms, each slot, for example, slot i 236 may have a time period, $T_{slot}$ equal to 2560 chips, for example.

Figure 2B:
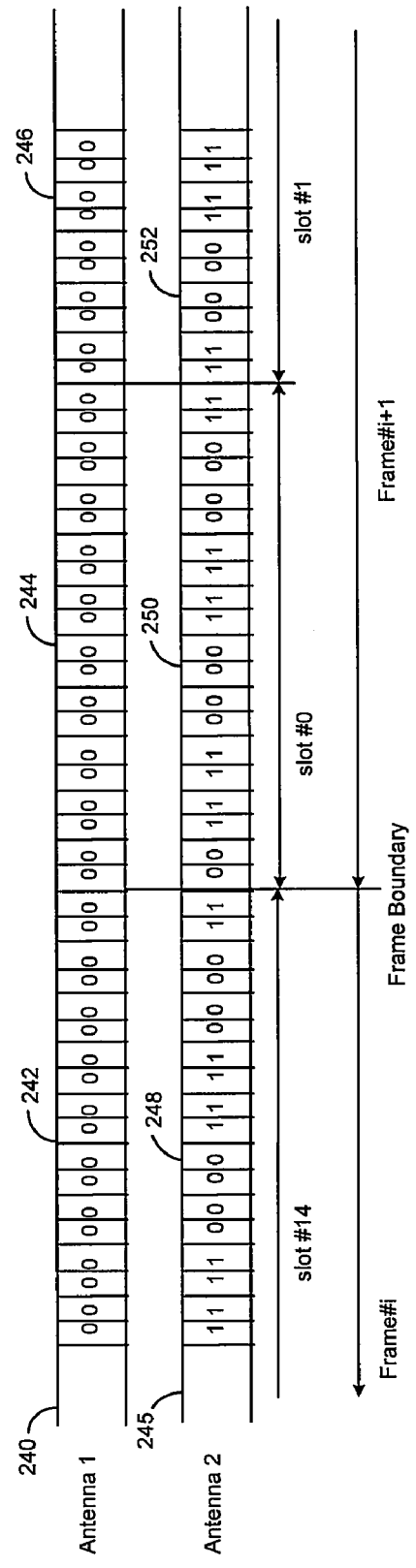
FIG. 2B is a diagram of an exemplary modulation pattern for a common pilot channel with transmit diversity, in accordance with an embodiment of the invention.

FIG. 2B is a diagram of an exemplary modulation pattern for a common pilot channel with transmit diversity, in accordance with an embodiment of the invention. Referring to FIG. 2B, there is shown a CPICH modulation pattern for antenna 1 240, and a CPICH modulation pattern for antenna 2 245.

The CPICH modulation pattern for antenna 1 240 may comprise a plurality of frames, for example, frame i, and frame i+1 that may be separated by a frame boundary. Each frame in the CPICH modulation pattern for antenna 1 240 may comprise a plurality of slots, for example, 15 slots. For example, frame i may comprise slot 14 242, and frame i+1 may comprise slot 0 244 and slot 1 246. The CPICH modulation pattern for antenna 2 245 may comprise a plurality of frames, for example, frame i, and frame i+1 that may be separated by a frame boundary. Each frame in the CPICH modulation pattern for antenna 2 245 may comprise a plurality of slots, for example, 15 slots. For example, frame i may comprise slot 14 248, and frame i+1 may comprise slot 0 250 and slot 1 252.

The process of achieving diversity gain may be utilized to combat multipath fading in wireless cellular communication systems, since the signal quality may be improved without increasing the transmit power or loss of bandwidth efficiency. In a single antenna WCDMA handset, the fading from different multipath signals may be independent. The receiver may be enabled to demodulate the same signal from a few different multipath signals and combine the various multipath signals. The resulting combined signal may be stronger than a single signal. If open or closed loop diversity is used on a downlink channel in the cell, the CPICH may be transmitted from antenna 1 and antenna 2 using the same channelization and scrambling code, for example. The pre-defined bit sequence of CPICH modulation pattern for antenna 1 240 may be different from the pre-defined bit sequence of CPICH modulation pattern for antenna 2 245.

Figure 3A:
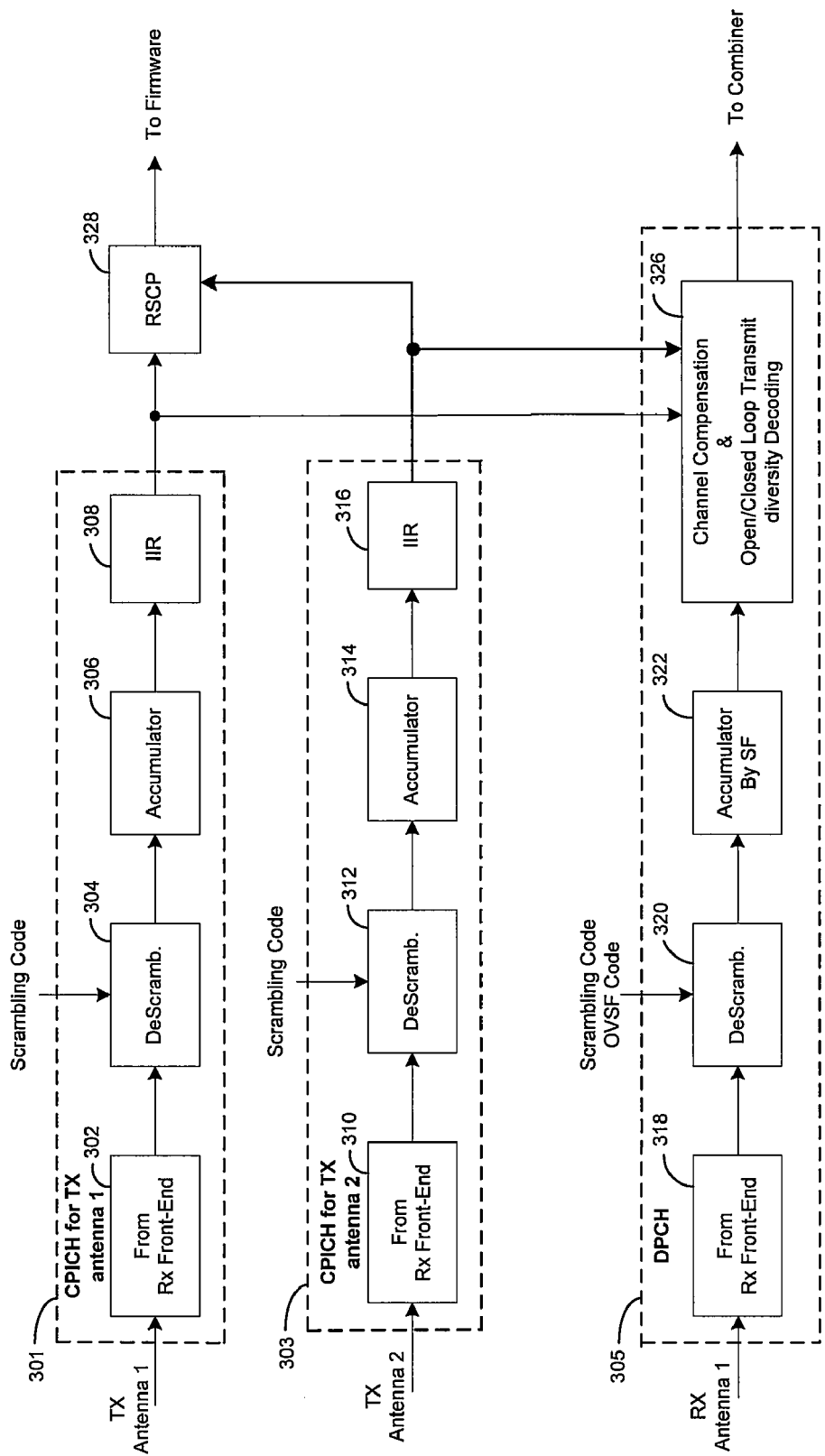
FIG. 3A is a block diagram of an exemplary finger structure for transmit antenna diversity, in accordance with an embodiment of the invention.

FIG. 3A is a block diagram of an exemplary finger structure for transmit antenna diversity, in accordance with an embodiment of the invention. Referring to FIG. 3A, there is shown a common pilot channel for transmit antenna 1 (CPICH1) 301, a common pilot channel for transmit antenna 2 (CPICH2) 303, a dedicated physical channel (DPCH) block 305, and received signal code power (RSCP) block 328.

The CPICH1 301 may comprise a receiver frontend block 302, a descrambler 304, an accumulator 306, and an IIR filter 308. The CPICH2 303 may comprise a receiver frontend block 310, a descrambler 312, an accumulator 314, and an IIR filter 316. The DPCH block 305 may comprise a receiver frontend block 318, a descrambler 320, an accumulator 322, and a channel compensation and decoding block 326.

The plurality of receiver frontend blocks 302 and 310 may comprise suitable logic, circuitry, and/or code that may be enabled to process a received RF signal from transmit antenna 1 and transmit antenna 2 respectively. The receiver frontend block 318 may comprise suitable logic, circuitry, and/or code that may be enabled to process a received RF signal from receiver antenna 1. The plurality of receiver frontend blocks 302, 310 and 318 may perform, for example, filtering, amplification, and analog-to-digital (A/D) conversion operations. The plurality of receiver frontend blocks 302, 310 and 318 may be enabled to amplify and convert the received analog RF signal down to baseband. The plurality of receiver frontend blocks 302, 310 and 318 may comprise an analog-to-digital (A/D) converter that may be utilized to digitize the received analog baseband signal.

The plurality of descramblers 304, 312 and 320 may comprise suitable logic, circuitry, and/or code that may be enabled to multiply the received signal by a scrambling code and delayed versions of the scrambling code. Each delay may correspond to a separate multipath that may be combined by the rake receiver 100. The plurality of descramblers 304, 312 and 320 may be enabled to despread the descrambled data of each path by multiplying the descrambled data with the spreading code. The plurality of descramblers 304, 312 and 320 may also be enabled to multiply the received signals by a scrambling code and/or orthogonal variable spreading factor (OVSF) code.

The plurality of accumulators 306, 314 and 322 may comprise suitable logic, circuitry, and/or code that may be enabled to accumulate the descrambled signals from the plurality of descramblers 304, 312 and 320 respectively. The plurality of IIR filters 308 and 316 may comprise suitable logic, circuitry, and/or code that may be enabled to IIR filter the received signal paths from the plurality of accumulators 306 and 314 respectively and generate an output signal to the RSCP block 328 and the channel compensation and decoding block 326.

The channel compensation and decoding block 326 may be enabled to multiply the received signal from the accumulator 322 by the corresponding channel information and an output signal may be generated to a combiner. The RSCP block 328 may comprise suitable logic, circuitry, and/or code that may be enabled to measure the receive signal code power or the SNR of the plurality of multipath signals from transmit antenna 1 and transmit antenna 2 and generate the output signals to a control unit/firmware.

The generalization code of at least one pilot channel, for example, CPICH1 301 or CPICH2 303, which may measure signal strengths for each of a plurality of received multipath signals may be modified. The signal strengths of the plurality of received multipath signals may be measured on a pilot channel, CPICH1 301, for example, by assigning its generalization code or scrambling code in the descrambler 304 to zero.

Figure 3B:
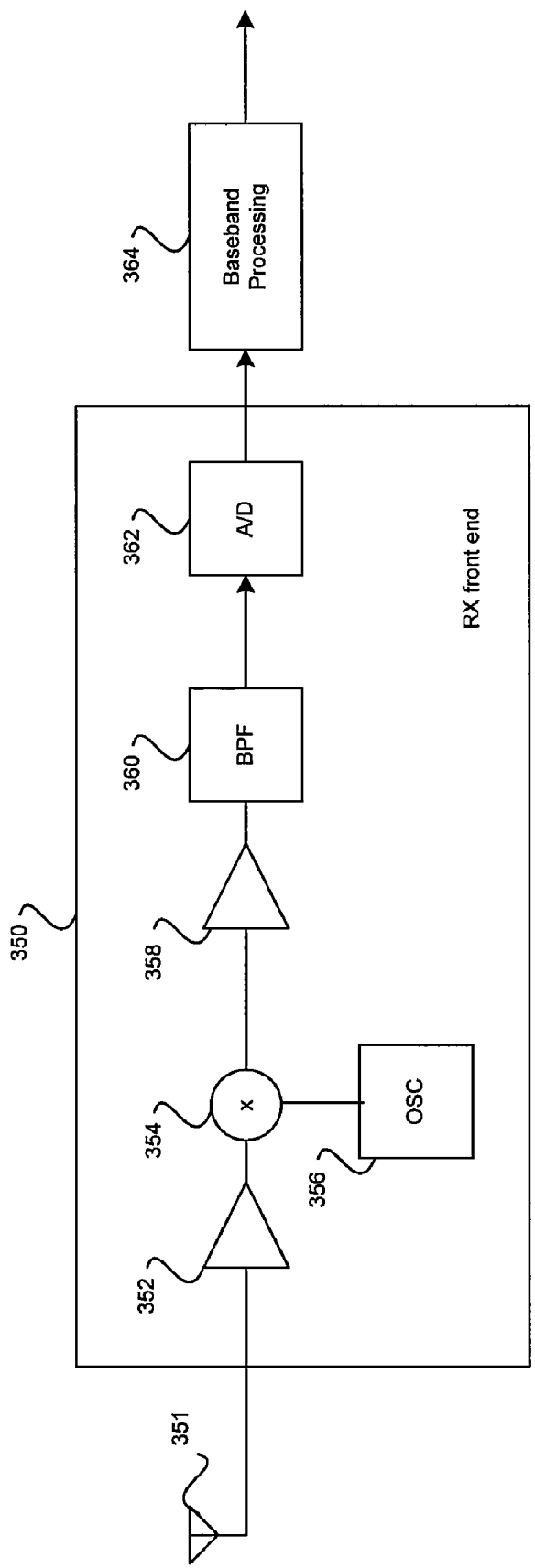
FIG. 3B is a block diagram of an exemplary receiver front end, in accordance with an embodiment of the invention.

FIG. 3B is a block diagram of an exemplary receiver front end, in accordance with an embodiment of the invention. Referring to FIG. 3B, there is shown a receiver frontend block 350, a receiver antenna 351, and a baseband processing block 364. The receiver frontend block 350 may comprise a low noise amplifier (LNA) 352, a mixer 354, an oscillator 356, a low noise amplifier 358, a bandpass filter 360 and an analog-to-digital converter (A/D) 362.

The receiver frontend block 350 may comprise suitable circuitry, logic and/or code that may be enabled to convert a received RF signal down to baseband. An input of the low noise amplifier 352 may be coupled to the antenna 351 so that it may receive RF signals from the antenna 351. The low noise amplifier 352 may comprise suitable logic, circuitry, and/or code that may be enabled to receive an input RF signal from the antenna 351 and amplify the received RF signal in such a manner that an output signal generated by the low noise amplifier 352 has low additional noise.

The mixer 354 in the receiver frontend block 350 may comprise suitable circuitry and/or logic that may be enabled to mix an output of the low noise amplifier 352 with an oscillator signal generated by the oscillator 356. The oscillator 356 may comprise suitable circuitry and/or logic that may be enabled to provide a oscillating signal that may be enabled to mix the output signal generated from the output of the low noise amplifier 352 down to a baseband. The low noise amplifier (LNA) or amplifier 358 may comprise suitable circuitry and/or logic that may be enabled to low noise amplify and output signal generated by the mixer 354. An output of the low noise amplifier or amplifier 358 may be communicated to the transmit path bandpass filter 360. The bandpass filter 360 may comprise suitable logic, circuitry and/or code that may be enabled to bandpass filter the output signal generated from the output of the low noise amplifier 360. The bandpass filter block 360 may be enabled to retain a desired signal and filter out unwanted signal components such as higher signal components comprising noise. An output of the bandpass filter 360 may be communicated to the analog-digital-converter 362 for processing.

The analog-to-digital converter (A/D) 362 may comprise suitable logic, circuitry and/or code that may be enabled to convert the analog signal generated from the output of the transmit path bandpass filter 360 to a digital signal. The analog-to-digital converter 362 may generate a sampled digital representation of the bandpass filtered signal that may be communicated to the baseband-processing block 364 for processing. The baseband processing block 364 may comprise suitable logic, circuitry and/or code that may be enabled to process digital baseband signals received form an output of the A/D 362. Although the A/D 362 is illustrated as part of the receiver frontend block 350, the invention may not be so limited. Accordingly, the A/D 362 may be integrated as part of the baseband processing block 364. In operation, the receiver frontend block 350 may be enabled to receive RF signals via antenna 351 and convert the received RF signals to a sampled digital representation, which may be communicated to the baseband processing block 364 for processing.

Figure 4:
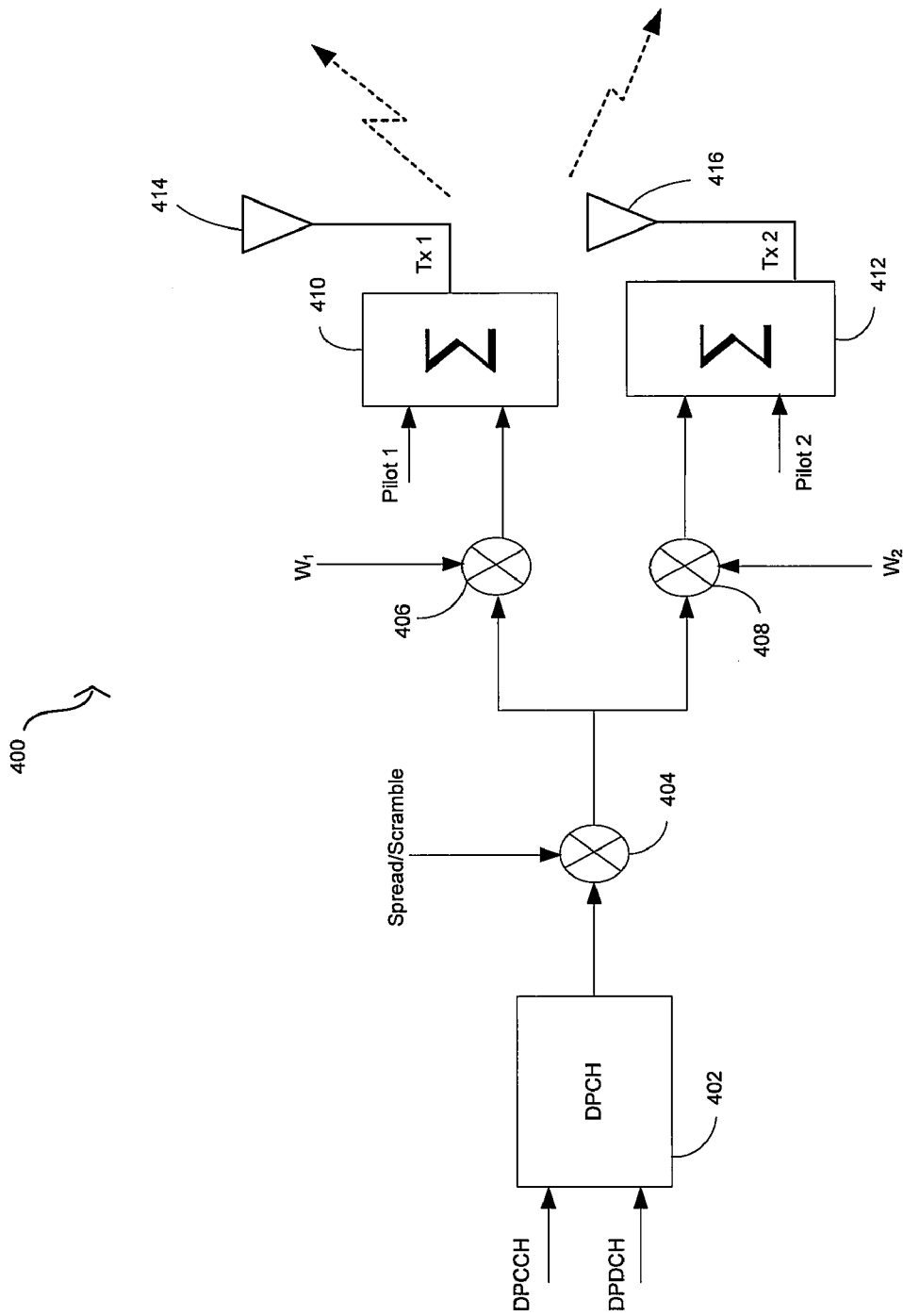
FIG. 4 is a block diagram of an exemplary transmitter with antenna diversity, in accordance with an embodiment of the invention.

FIG. 4 is a block diagram of an exemplary transmitter with antenna diversity, in accordance with an embodiment of the invention. Referring to FIG. 4, the transmitter 400 may comprise a dedicated physical channel (DPCH) block 402, a plurality of mixers 404, 406, and 408, a plurality of combiners 410 and 412, a first transmit antenna (Tx 1) 414 and an additional transmit antenna (Tx 2) 416.

The DPCH block 402 may be enabled to receive a plurality of input channels, for example, a dedicated physical control channel (DPCCH) and a dedicated physical data channel (DPDCH). The DPCH block 402 may simultaneously control the power of DPCCH and DPDCH. The mixer 404 may be enabled to mix the output of DPCH block 402 with a spread and/or scrambled signal to generate a spread complex valued signal that may be input to mixers 406 and 408. The mixers 406 and 408 may weight the complex valued input signals with weight factors $W_1$ and $W_2$, respectively, and may generate outputs to a plurality of combiners 410 and 412 respectively. The combiners 410 and 412 may combine the outputs generated by mixers 406 and 408 with a pilot channel 1, for example, common pilot channel 1 (CPICH1) and a pilot channel 2, for example, common pilot channel 2 (CPICH2) respectively. The common pilot channels 1 and 2 may have a fixed channelization code allocation that may be utilized to measure the phase amplitude signal strength of the channels. The antennas 414 and 416 may receive the generated outputs from the combiners 410 and 412 and may transmit wireless signals.

In closed loop mode 1 for example, the weight factor $W_1$ may be a constant scalar and the weight factor $W_2$ may be a complex valued signal. The weight factor $W_2$ or the corresponding phase adjustment 0 may be determined by the user equipment (UE), and may be signaled to the UMTS terrestrial radio access network (UTRAN) access point or cell transceiver by utilizing the feed back indicator (FBI) field of uplink DPCCH. For closed loop mode 1, different orthogonal dedicated pilot symbols in the downlink DPCCH may be transmitted via the two antennas, for example. The UE may utilize the CPICH to separately estimate the channels seen from each antenna. The UE may compute the phase adjustment, $w_2 = e^{j\Phi}$ once every slot, for example, and may be applied at the UTRAN access point to maximize the UE 60 received power.

In a non-soft handover case, the computation of feedback information may be computed by, for example, solving for weight vector, w that maximizes:

$$P = w^H H^H H w \qquad (1)$$

where $H = [h_1 \ h_2]$ and $w = [w_1, w_2]^T$ and where the column vectors $h_1$ and $h_2$ represent the estimated channel impulse responses for the transmission antennas 1 and 2, of length equal to the length of the channel impulse response, for example. The elements of w may correspond to the adjustments computed by the UE 60.

Figure 5A:
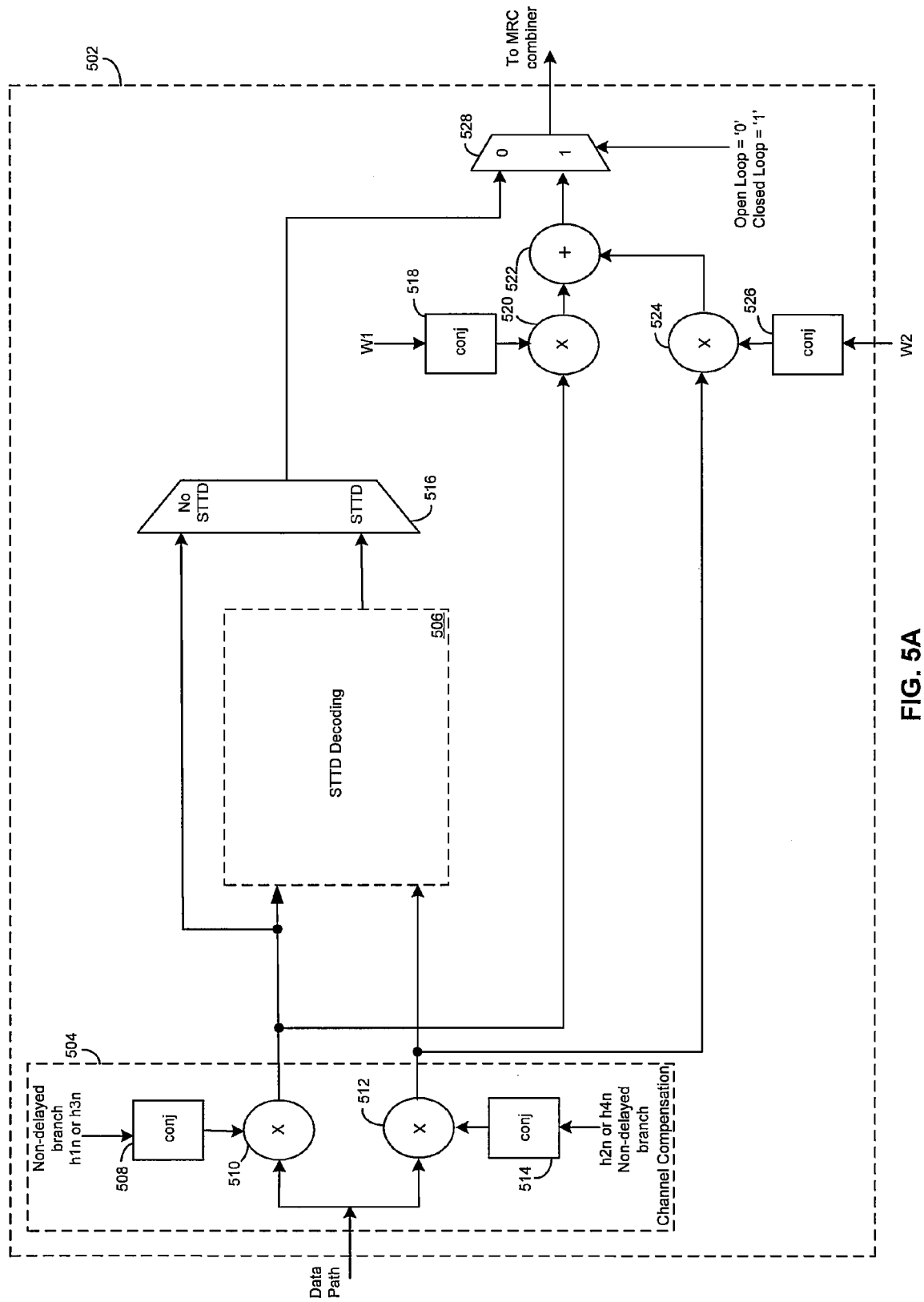
FIG. 5A is an exemplary block diagram illustrating derotation and decoding of received signals in a rake receiver without delay matching, in accordance with an embodiment of the invention.

FIG. 5A is an exemplary block diagram illustrating derotation and decoding of received signals in a rake receiver without delay matching, in accordance with an embodiment of the invention. Referring to FIG. 5A, there is shown a channel compensation and space time transmit diversity (STTD) decoding block 502. The channel compensation and STTD decoding block 502 may comprise a channel compensation block 504, a STTD decoding block 506, a plurality of multiplexers 516 and 528, a plurality of multipliers 520 and 524, a plurality of conjugate blocks 518 and 526, and a summer 522.

The channel compensation block 504 may comprise a plurality of conjugate blocks 508 and 514, and a plurality of multipliers 510 and 512. The channel compensation block 504 may be enabled to receive the data signals from the accumulator 322. The channel compensation block 504 may be enabled to receive the channel estimates for the non-delay matched branch, h1n or h3n either from the IIR filter 308 in CPICH 1 301 or from the output of the FIR filter 575 (FIG. 5B) corresponding to the non-delay matched branch. The channel estimation block 504 may be enabled to receive the channel estimates for the non-delay matched branch h2n or h4n either from the IIR filter 316 in CPICH 2 303 or from the output of the FIR filter 575 (FIG. 5B) corresponding to the non-delay matched branch.

The plurality of conjugate blocks 508 and 514 may be enabled to generate the conjugates of the received channel estimates, h1n and h2n, from the IIR filters 308 and 316 respectively or the filter block 575. The multiplier 510 may be enabled to multiply the received data signal from the accumulator 322 and the conjugate of the channel estimate h1n for the non-delay matched branch and generate a first derotated output. The multiplier 512 may be enabled to multiply the received data signal from the accumulator 322 and the conjugate of the channel estimate h2n for the non-delay matched branch and generate a second derotated output. The first derotated output may be received by the multiplexer 516. Both the first and second derotated outputs may be received by the STTD decoding block 506.

The STTD decoding block 506 may comprise suitable logic, circuitry, and/or code that may be enabled to receive two derotated output signals from the channel compensation block 504 and decode the received derotated signals based on open or closed loop transmit diversity and generate a decoded output signal to the multiplexer 516.

The multiplexer 516 may be enabled to receive a first derotated output from the channel compensation block 504 and a decoded output signal from the STTD decoding block 506 and select a particular signal based on determining whether transmit diversity has been implemented in the rake receiver. If no transmit diversity has been implemented in the rake receiver, the multiplexer 516 may be enabled to select the first derotated output from the channel compensation block 504 and output the selected derotated output to the MRC combiner via the multiplexer 528. If transmit diversity has been implemented in the rake receiver, the multiplexer 516 may be enabled to select the decoded output signal from the STTD decoding block 506 and generate an output to the multiplexer 528.

For closed loop transmit diversity, the plurality of conjugate blocks 518 and 526 may be enabled to receive a plurality of weight factors $W_1$ and $W_2$, respectively from the CL weight factors control WCDMA block 182. For example, for finger 0, the plurality of conjugate blocks 518 and 526 may be enabled to generate the conjugates of the received weight factors, W1_0 and W2_0 respectively.

The multiplier 520 may be enabled to multiply the received first derotated output from the channel compensation block 504 and the conjugate of the received weight factor $W_1$ for the non-delay matched branch and generate a first output to the summer 522. The multiplier 524 may be enabled to multiply the received second derogated output from the channel compensation block 504 and the conjugate of the received weight factor $W_2$ for the non-delay matched branch and generate a second output to the summer 522. The summer 522 may be enabled to sum the received first and second outputs and generate an output to the multiplexer 528.

For open loop transmit diversity, the multiplexer 528 may be enabled to select the received output from the multiplexer 516 and generate an output to the MRC combiner. For closed loop transmit diversity, the multiplexer 528 may be enabled to select the received output from the summer 522, and generate an output to the MRC combiner.

Figure 5B:
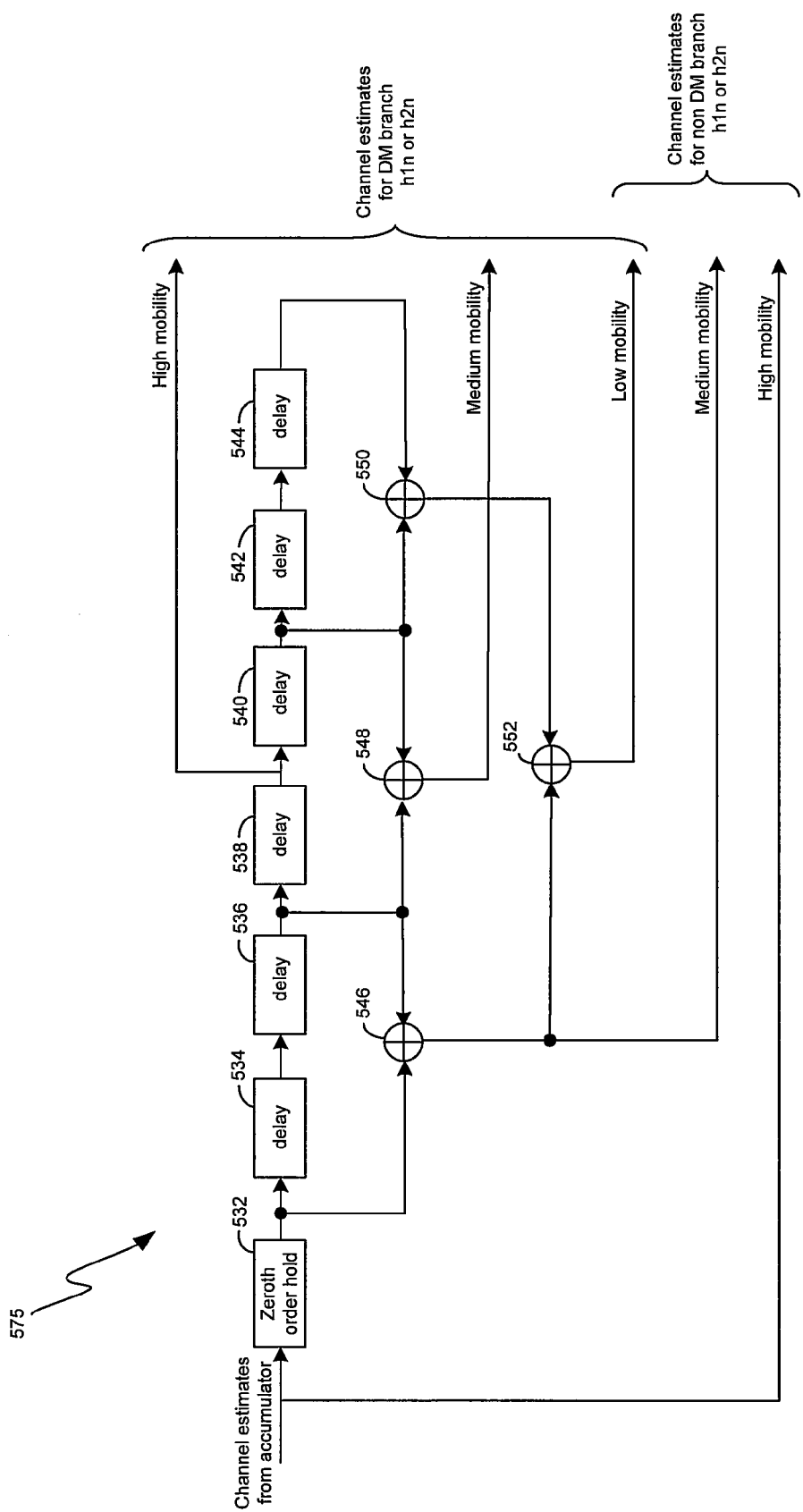
FIG. 5B is an exemplary block diagram illustrating generation of channel estimates in a rake receiver, in accordance with an embodiment of the invention.

FIG. 5B is an exemplary block diagram illustrating generation of channel estimates in a rake receiver, in accordance with an embodiment of the invention. Referring to FIG. 5B, there is shown a filter block 575 that may comprise a zeroth order hold 532, a plurality of delay blocks 534, 536, 538, 540, 542, and 544, and a plurality of summers 546, 548, 550, and 552.

The zeroth order hold 532 may be enabled to receive and hold the channel estimates, h1n or h2n from the plurality of accumulators 306 and 314 respectively and hold or repeat them until they receive the next sample or channel estimate. The plurality of delay blocks 534, 536, 538, 540, 542, and 544 may each be enabled to FIR filter the received channel estimates, h1n or h2n. A velocity estimator may be enabled to determine the speed of the user equipment (UE) 190 and categorize the speed of the current channel into a plurality of categories, for example, high mobility, medium mobility, or low mobility. The channel estimates for the delay matched branch may be passed through a series of FIR filters or delay blocks 534, 536, 538, 540, 542, and 544 based on the speed of the UE 190. For example, for a UE 190 with low mobility, the channel estimates may undergo more filtering and averaging compared to a UE 190 with medium or high mobility. The channel estimates for the delay matched branch may have a constant group delay of X chips, for example. The channel estimates for the delay matched branch may be applied to the received data signals from the accumulator 322, which may also be delayed by X chips, for example. The channel estimates and received data may be delayed by a particular time period and may be delay-matched, which may yield a better performance than if they were delay-mismatched.

The channel estimates for the non-delay matched branch may be filtered through a series of FIR filters or delay blocks 534, 536, 538, 540, 542, and 544 based on the speed of the UE 190. For example, for a UE 190 with low mobility, the channel estimates may undergo more filtering and averaging compared to a UE 190 with medium or high mobility. The channel estimates for the non delay matched branch may have a variable group delay. Meanwhile, the received data signals from the accumulator 322 are not delayed. Accordingly, there may be a delay mismatch between the channel estimate and the received data. This delay mismatch may vary according to the delay undergone by the channel estimate. For example, for a UE 190 with high mobility, the delay mismatch may be small, but for a UE 190 with low mobility, the delay mismatch may be larger compared to the delay for a UE 190 with medium mobility or a UE 190 with high mobility. In accordance with an embodiment of the invention, it may be optimal to match the delay of the channel estimate and the received data. The received data may not be delayed for power control loops, for example, as they may have to be processed without delay.

FIG. 6A is an exemplary block diagram for calculating closed loop weight factors in a rake receiver with delay matching, in accordance with an embodiment of the invention. Referring to FIG. 6A, there is shown a plurality of switches 602 and 604, a closed loop (CL) weight factors computation block 606, a divider block 608 and a delay block 610.

The switch 602 may be enabled to receive the rake receiver output channel estimate for non-delay matched branch for antenna 1, for example, h1n (no DM), and the rake receiver output channel estimate for the delay matched branch for antenna 1, for example, h1n (DM). The switch 602 may be enabled to select one of the received rake receiver output channel estimates, for example, the rake receiver output channel estimate for non-delay matched branch for antenna 1, h1n (no DM), or the rake receiver output channel estimate for the delay matched branch for antenna 1, h1n (DM) and output the corresponding in-phase (I) and quadrature (Q) components of the channel estimates for antenna 1, Hi_ant1 and Hq_ant1 respectively.

The switch 604 may be enabled to receive the rake receiver output channel estimate for non-delay matched branch for antenna 2, for example, h2n (no DM), and the rake receiver output channel estimate for the delay matched branch for antenna 2, for example, h2n (DM). The switch 604 may be enabled to select one of the received rake receiver output channel estimates, for example, the rake receiver output channel estimate for non-delay matched branch for antenna 2, h2n (no DM), or the rake receiver output channel estimate for the delay matched branch for antenna 2, h2n (DM) and output the corresponding in-phase (I) and quadrature (Q) components of the channel estimates for antenna 2, Hi_ant2 and Hq_ant2 respectively.

The CL weight factors computation block 606 may comprise suitable logic, circuitry and/or code that may be enabled to receive the rake receiver output channel estimates, for example, Hi_ant1, Hq_ant1, Hi_ant2, Hq_ant2, and a slot strobe that may indicate the slot end boundary at the rake receiver. The received channel estimates, for example, Hi_ant1, Hq_ant1, Hi_ant2, Hq_ant2 may each be a 1×Nf vector, for example, if the rake receiver has Nf fingers. The received channel estimates, for example, Hi_ant1, Hq_ant1, Hi_ant2, Hq_ant2 may each be for the non-delay matched branch or the delay matched branch based on the selection of the switches 602 and 604.

The channel estimates may be sampled once per slot, and may be passed to the CL weight factors computation block 606. The CL weight factors computation block 606 may be enabled to compute the weight factors, for example, by solving for weight vector, w, that maximizes:

$$P = w^H H^H H w \quad (1)$$

where $H = [h_1 \ h_2]$ and $w = [w_1, w_2]^T$ and where the column vectors $h_1$ and $h_2$ represent the estimated channel impulse responses for the transmission antennas 1 and 2, of length equal to the length of the channel impulse response, for example. The elements of w may correspond to the adjustments computed by the UE 190. In accordance with an embodiment of the invention, the CL mode weight factors may also, for example, be updated once per slot. The weight factor $W_1$ may be a constant scalar, for example, the amplitude of $W_1$, w1_ampl may be equal to 90, for example. The weight factor $W_2$ may be a complex valued signal, for example, the in-phase component of $W_2$, w2_i may be equal to +/−64, and the quadrature (Q) component of $W_2$, w2_q may be equal to +/−64.

The divider block 608 may be enabled to receive the weight factors, $W_1$ and $W_2$ from the CL weight factors computation block 606, and divide the received weight factors by 90. The divider block 608 may be enabled to generate a plurality of complex valued weight factors, w1_cmplx and w2_cmplx, where w1_cmplx may be equal to 1, for example, and w2_cmplx may be equal to +/−(64/90)+/−j*(64/90). The complex valued weight factors may be communicated to the transmitter.

The delay block 610 may be enabled to receive the weight factors, $W_1$ and $W_2$ from the CL weight factors computation block 606, and delay the received weight factors by 1.5 slots, for example. Notwithstanding, the received weight factors may be delayed by any other suitable number of slots. The delay block 610 may be enabled to generate a plurality of complex valued delayed weight factors, w1_cmplx_delay and w2_cmplx_delay, where w1_cmplx_delay may be equal to 90, for example, and w2_cmplx_delay may be equal to +/−64+/−j64. The complex valued delayed weight factors may be communicated to the rake receiver.

FIG. 6B is an exemplary block diagram utilizing closed loop weight factors in a base station transmitter, in accordance with an embodiment of the invention. Referring to FIG. 6B, there is shown a base station (BTS) timing control block 612, and a base station (BTS) 614.

The BTS timing control block 612 may comprise suitable logic, circuitry, and/or code that may be enabled to receive the complex valued weight factors, w1_cmplx and w2_cmplx, from the divider block 610, and a transmitter slot strobe that indicates the slot end boundary. The BTS timing control block 612 may be enabled to delay the received complex valued weight factors, w1_cmplx and w2_cmplx, until they are aligned with the next occurrence of the transmitter slot end boundary plus one full slot delay, for example. The BTS timing control block 612 may be enabled to generate a plurality of dedicated physical channel (DCH) weight factors, W1_dch and W2_dch, which correspond to delayed values of w1_cmplx and w2_cmplx. The BTS 614 may be enabled to receive the plurality of DCH weight factors, W1_dch and W2_dch from the BTS timing control block 612 to optimize the system performance at the output of the rake receiver.

FIG. 6C is an exemplary block diagram utilizing closed loop weight factors in a rake receiver with delay matching, in accordance with an embodiment of the invention. Referring to FIG. 6C, there is shown a CL weight factors control WCDMA block 616, and a plurality of rake receiver fingers, for example, finger 0 618 to finger Nf−1 $618_{Nf-1}$.

The CL weight factors control WCDMA block 616 may comprise suitable logic, circuitry, and/or code that may be enabled to receive the complex valued delayed weight factors, w1_cmplx delay and w2_cmplx delay, from the delay block 610, and a plurality of receiver slot strobes that indicate the slot end boundary, for example, receiver slot strobe each for finger 0 to finger Nf−1. The CL weight factors control WCDMA block 616 may be enabled to delay the received complex valued delayed weight factors, w1_cmplx_delay and w2_cmplx_delay, until they are aligned with the next occurrence of the slot end boundary, for example, for 2 slots. The CL weight factors control WCDMA block 616 may be enabled to generate a plurality of weight factors, for example, W1_0 and W2_0 for the non-delay matched branch of finger 0 618, W1_Nf−1 and W2_Nf−1 for the non-delay matched branch of finger Nf−1 $618_{Nf-1}$ to optimize the system performance at the output of the rake receiver. For example, the received signals that comprise control bits such as transmit power control (TPC) bits and/or dedicated pilot bits may not be delayed, and may be processed via the non-delayed matching branch.

The generated plurality of weight factors for each finger in the rake receiver may be further delayed by at least one delay block. For example, the generated plurality of weight factors for finger 0, W1_0 and W2_0 may be further delayed by the delay block 620 by X chips, for example. Similarly, the generated plurality of weight factors for finger Nf–1, W1_Nf–1 and W2_Nf–1 may be further delayed by the delay block 620$_{Nf-1}$ by X chips, for example.

In accordance with an embodiment of the invention, if the channel estimates for the delay matched branch are chosen by switches 602 and 604, the block error rate (BLER) of the delay matched received signals may be optimized in closed loop modes operation compared to the BLER of the non-delay matched received signals. In accordance with another embodiment of the invention, if the channel estimates for the non-delay matched branch are chosen by switches 602 and 604, the BLER of the non-delay matched received signals may be optimized in closed loop modes operation compared to the BLER of the delay matched received signals.

Figure 7:
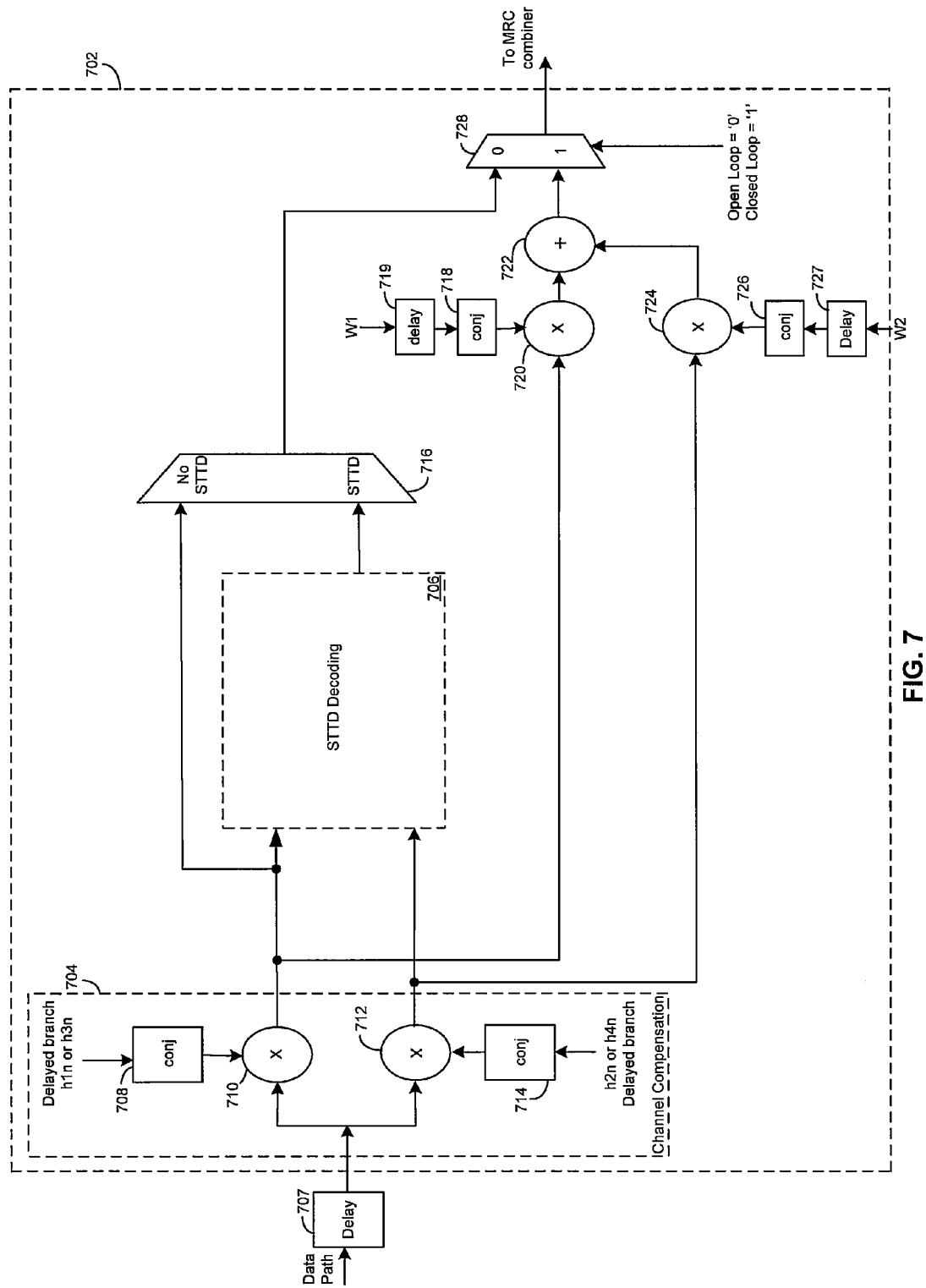
FIG. 7 is an exemplary block diagram illustrating derotation and decoding of received signals in a rake receiver with delay matching, in accordance with an embodiment of the invention.

FIG. 7 is an exemplary block diagram illustrating derotation and decoding of received signals in a rake receiver with delay matching, in accordance with an embodiment of the invention. Referring to FIG. 7, there is shown a channel compensation and space time transmit diversity (STTD) decoding block 702. The channel compensation and STTD decoding block 702 may comprise a channel compensation block 704, a STTD decoding block 706, a plurality of multiplexers 716 and 728, a plurality of multipliers 720 and 724, a plurality of conjugate blocks 718 and 726, a plurality of delay blocks 707, 719, and 727, and a summer 522.

The channel compensation block 704 may comprise a plurality of conjugate blocks 708 and 714, and a plurality of multipliers 710 and 712. The delay block 707 may be enabled to receive the data signals from the accumulator 322. The delay block 707 may be enabled to delay the received data signals by a particular time period and generate a delayed output of the received data signals to the channel compensation block 704. The channel compensation block 704 may be enabled to receive the channel estimates for the delay matched branch, h1$n$ and h2$n$ from the filter block 575 (FIG. 5B).

The plurality of conjugate blocks 708 and 714 may be enabled to generate the conjugates of the received channel estimates for the delay matched branch, h1$n$ and h2$n$, from the filter block 575. The multiplier 710 may be enabled to multiply the received delayed data signal from the accumulator 322 and the conjugate of the channel estimate h1$n$ for the delay matched branch and generate a first derotated output. The multiplier 712 may be enabled to multiply the received delayed data signal from the accumulator 322 and the conjugate of the channel estimate h2$n$ for the delay matched branch and generate a second derotated output. The first derotated output may be received by the multiplexer 716. Both the first and second derotated outputs may be received by the STTD decoding block 706.

The STTD decoding block 706 may comprise suitable logic, circuitry, and/or code that may be enabled to receive two derotated output signals from the channel compensation block 704 and decode the received derotated signals based on open or closed loop transmit diversity and generate a decoded output signal to the multiplexer 716.

The multiplexer 716 may be enabled to receive a first derotated output from the channel compensation block 704 and a decoded output signal from the STTD decoding block 706 and select a particular signal based on determining whether transmit diversity has been implemented in the rake receiver. If no transmit diversity has been implemented in the rake receiver, the multiplexer 716 may be enabled to select the first derotated output from the channel compensation block 704 and output the selected derotated output to the MRC combiner via the multiplexer 728. If transmit diversity has been implemented in the rake receiver, the multiplexer 716 may be enabled to select the decoded output signal from the STTD decoding block 706 and generate an output to the multiplexer 728.

For closed loop transmit diversity, the plurality of conjugate blocks 718 and 726 may be enabled to receive a plurality of weight factors $W_1$ and $W_2$, respectively from the CL weight factors control WCDMA block 616. For example, for finger 0, the plurality of delay blocks 719 and 727 may be enabled to delay the received plurality of weight factors W1_0 and W2_0 respectively by X chips, for example. The plurality of conjugate blocks 718 and 726 may be enabled to generate the conjugates of the received delayed weight factors, W1_0 and W2_0 respectively. Similarly, for finger Nf–1, the plurality of delay blocks 719 and 727 may be enabled to delay the received plurality of weight factors W1_Nf–1 and W2_Nf–1 respectively by X chips, for example. The plurality of conjugate blocks 718 and 726 may be enabled to generate the conjugates of the received delayed weight factors, W1_Nf–1 and W2_Nf–1 respectively.

The multiplier 720 may be enabled to multiply the received first derotated output from the channel compensation block 704 and the conjugate of the received delayed weight factor $W_1$ for the delay matched branch and generate a first output to the summer 722. The multiplier 724 may be enabled to multiply the received second derotated output from the channel compensation block 704 and the conjugate of the received delayed weight factor $W_2$ for the delay matched branch and generate a second output to the summer 722. The summer 722 may be enabled to sum the received first and second outputs and generate an output to the multiplexer 728.

For open loop transmit diversity, the multiplexer 728 may be enabled to select the received output from the multiplexer 716 and generate an output to the MRC combiner. For closed loop transmit diversity, the multiplexer 728 may be enabled to select the received output from the summer 722, and generate an output to the MRC combiner. In accordance with an embodiment of the invention, the timing of the received data signal may be aligned based on the weight factors that are fed back to the transmitter and the weight factors that are input to the rake receiver to demodulate the received signal.

In accordance with an embodiment of the invention, a method and system for delay matching in a rake receiver for WCDMA closed loop modes may comprise selection of a set of channel estimates, for example, h1$n$, h2$n$ from a plurality of channel estimates generated for at least one or both of the following: a delay matched branch and a non-delay matched branch in a rake receiver 150. For example, the plurality of switches 602 and 604 may be enabled to select one or more of a plurality of channel estimates for either the delay matched branch or the non-delay matched branch.

A plurality of weight factors, for example, $W_1$ and $W_2$ may be generated based on the selected set of channel estimates. For example, the plurality of weight factors, W1_0 and W2_0 may be generated for finger 0 618, W1_Nf–1 and W2_Nf–1 may be generated for finger Nf–1 618$_{Nf-1}$ based on the selected set of channel estimates. The application of the generated plurality of weight factors, for example, W1_0 and W2_0 generated for finger 0 618 may be delayed by a particular time period, for example, X chips by a delay block 620, and the plurality of weight factors, W1_Nf–1 and W2_Nf–1 generated for finger Nf–1 618$_{Nf-1}$ may be delayed by a particular time period, for example, X chips by a delay block 620$_{Nf-1}$. A delay associated with at least one or both of the following: a control channel, for example, CPICH 1 301 or CPICH 2 303 and a data channel, for example, DPCH 305 may be compensated based on the delayed application of the generated plurality of weight factors, for example, W1_0 and W2_0 generated for finger 0 618, W1_Nf–1 and W2_Nf–1 generated for finger Nf–1 $618_{Nf-1}$.

In operation of the non-delay-matched branch, the data channel, for example, DPCH 305 is not delayed with respect to the control channel, for example, CPICH 301 or CPICH 303. For the non-delay-matched branch, the channel compensation block 504 may be enabled to receive the plurality of channel estimates generated by the filter block 575 for the non-delay matched branch and derotate the received data signals. The STTD decoding block 506 may be enabled to decode the derotated received data signals, if the rake receiver 150 is operating in a space time transmit diversity (STTD) mode.

In operation of the delay-matched branch, the data channel, for example, DPCH 305 is delayed with respect to the control channel, for example, CPICH 301 or CPICH 303, by a particular time period. For the delay-matched branch, the channel compensation block 704 may be enabled to receive the plurality of channel estimates generated by the filter block 575 for the delay matched branch and derotate the received delayed data signals. The STTD decoding block 706 may be enabled to decode the derotated received data signals, if the rake receiver 150 is operating in a space time transmit diversity (STTD) mode. The plurality of delay blocks 719 and 727 may be enabled to compensate for the delay associated with the data channel, for example, DPCH 305 based on the delayed application of the generated plurality of weight factors, for example, W1_0 and W2_0 generated for finger 0 618, W1_Nf–1 and W2_Nf–1 generated for finger Nf–1 $618_{Nf-1}$, if the rake receiver 150 is operating in a closed loop mode. The BTS timing control block 612 may enable communication of the generated plurality of weight factors, for example, W1_dch and W2_dch to a base station BTS 614. The delay block 707 may enable delaying of received data via the data channel, for example, DPCH 305 by a particular time period, for example, X chips.

The generated plurality of channel estimates may be determined based on a determined velocity of a user equipment. The selected plurality of channel estimates may be based on the determined velocity of the user equipment. The channel estimates for the delay matched branch may be passed through a series of FIR filters or delay blocks 534, 536, 538, 540, 542, and 544 based on the speed of the UE 190. For example, for a UE 190 with low mobility, the channel estimates may undergo more filtering and averaging compared to a UE 190 with medium or high mobility. The channel estimates for the delay matched branch may have a constant group delay of X chips, for example. The channel estimates for the delay matched branch may be applied to the received data signals from the accumulator 322, which may also be delayed by X chips, for example.

The channel estimates for the non-delay matched branch may be filtered through a series of FIR filters or delay blocks 534, 536, 538, 540, 542, and 544 based on the speed of the UE 190. For example, for a UE 190 with low mobility, the channel estimates may undergo more filtering and averaging compared to a UE 190 with medium or high mobility. The channel estimates for the delay matched branch may have a variable group delay. If the received data signals from the accumulator 322 are not delayed, there may be a delay mismatch between the channel estimate and the received data. This delay mismatch may vary according to the delay undergone by the channel estimate. For example, for a UE 190 with high mobility, the delay mismatch may be small, but for a UE 190 with low mobility, the delay mismatch may be larger compared to the delay for a UE 190 with medium mobility or a UE 190 with high mobility.

Another embodiment of the invention may provide a machine-readable storage, having stored thereon, a computer program having at least one code section executable by a machine, thereby causing the machine to perform the steps as described above for delay matching in a rake receiver for WCDMA closed loop modes.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
    in a rake receiver, generating a plurality of channel estimates for at least one or both of the following: a delay matched branch and a non-delay matched branch;
    selecting a set of channel estimates from said generated plurality of channel estimates and generating a plurality of weight factors based on said selected set of channel estimates;
    in said delay matched branch of said rake receiver, delaying application of said generated plurality of weight factors by a particular time period; and
    in said delay matched branch of said rake receiver, compensating for a delay associated with at least one or both of the following: a control channel and a data channel, based on said delayed application of said generated plurality of weight factors.

2. The method according to claim 1, wherein said data channel is delayed with respect to said control channel by a particular time period.

3. The method according to claim 1, wherein said control channel is a common pilot control channel (CPICH).

4. The method according to claim 1, wherein said data channel is a dedicated physical channel (DPCH).

5. The method according to claim 1, comprising derotating signals received via said data channel with said plurality of channel estimates generated for said delay matched branch.

6. The method according to claim 5, comprising if said rake receiver is operating in a space time transmit diversity (STTD) mode, decoding said derotated signals received via said data channel.

7. The method according to claim 1, wherein said set of channel estimates is selected to be equal to said generated plurality of channel estimates for said delay matched branch to optimize a block error rate of data received via said data channel.

8. The method according to claim 1, comprising if said rake receiver is operating in a closed loop mode, compensating for said delay associated with said data channel based on said delayed application of said generated plurality of weight factors.

9. The method according to claim 1, comprising communicating said generated plurality of weight factors to a base station.

10. The method according to claim 1, wherein said generated plurality of channel estimates is based on a determined velocity of a user equipment.

11. A machine-readable storage having stored thereon, a computer program having at least one code section for processing signals, the at least one code section being executable by a machine for causing the machine to perform steps comprising:
   in a rake receiver, generating a plurality of channel estimates for at least one or both of the following: a delay matched branch and a non-delay matched branch;
   selecting a set of channel estimates from said generated plurality of channel estimates and generating a plurality of weight factors based on said selected set of channel estimates;
   in said delay matched branch of said rake receiver, delaying application of said generated plurality of weight factors by a particular time period; and
   in said delay matched branch of said rake receiver, compensating for a delay associated with at least one or both of the following: a control channel and a data channel, based on said delayed application of said generated plurality of weight factors.

12. The machine-readable storage according to claim 11, wherein said data channel is delayed with respect to said control channel by a particular time period.

13. The machine-readable storage according to claim 11, wherein said control channel is a common pilot control channel (CPICH).

14. The machine-readable storage according to claim 11, wherein said data channel is a dedicated physical channel (DPCH).

15. The machine-readable storage according to claim 11, wherein said at least one code section comprises code for derotating signals received via said data channel with said plurality of channel estimates generated for said delay matched branch.

16. The machine-readable storage according to claim 15, wherein said at least one code section comprises code for decoding said derotated said signals received via said data channel, if said rake receiver is operating in a space time transmit diversity (STTD) mode.

17. The machine-readable storage according to claim 11, wherein said set of channel estimates is selected to be equal to said generated plurality of channel estimates for said delay matched branch to optimize a block error rate of data received via said data channel.

18. The machine-readable storage according to claim 11, wherein said at least one code section comprises code for compensating for said delay associated with said data channel based on said delayed application of said generated plurality of weight factors, if said rake receiver is operating in a closed loop mode.

19. The machine-readable storage according to claim 11, wherein said at least one code section comprises code for communicating said generated plurality of weight factors to a base station.

20. The machine-readable storage according to claim 11, wherein said generated plurality of channel estimates is based on a determined velocity of a user equipment.

21. A system for processing signals, the system comprising:
   one or more circuits in a rake receiver that enables generation of a plurality of channel estimates for at least one or both of the following: a delay matched branch and a non-delay matched branch;
   said one or more circuits enables selection of a set of channel estimates from said generated plurality of channel estimates and generating a plurality of weight factors based on said selected set of channel estimates;
   said one or more circuits enables delaying application of said generated plurality of weight factors by a particular time period in said delay matched branch of said rake receiver; and
   said one or more circuits enables compensation for a delay associated with at least one or both of the following: a control channel and a data channel, based on said delayed application of said generated plurality of weight factors in said delay matched branch of said rake receiver.

22. The system according to claim 21, wherein said data channel is delayed with respect to said control channel by a particular time period.

23. The system according to claim 21, wherein said control channel is a common pilot control channel (CPICH).

24. The system according to claim 21, wherein said data channel is a dedicated physical channel (DPCH).

25. The system according to claim 21, wherein said one or more circuits enables derotation of signals received via said data channel with said plurality of channel estimates generated for said delay matched branch.

26. The system according to claim 25, wherein said one or more circuits enables decoding of said derotated said signals received via said data channel, if said rake receiver is operating in a space time transmit diversity (STTD) mode.

27. The system according to claim 21, wherein said set of channel estimates is selected to be equal to said generated plurality of channel estimates for said delay matched branch to optimize a block error rate of data received via said data channel.

28. The system according to claim 21, wherein said one or more circuits enables compensation for said delay associated with said data channel based on said delayed application of said generated plurality of weight factors, if said rake receiver is operating in a closed loop mode.

29. The system according to claim 21, wherein said one or more circuits enables communication of said generated plurality of weight factors to a base station.

30. The system according to claim 21, wherein said generated plurality of channel estimates is based on a determined velocity of a user equipment.

* * * * *